(12) United States Patent
Nishikawa

(10) Patent No.: US 10,047,744 B2
(45) Date of Patent: *Aug. 14, 2018

(54) VANE PUMP DEVICE

(71) Applicant: Showa Corporation, Gyoda-shi (JP)

(72) Inventor: Toshio Nishikawa, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,550

(22) Filed: Aug. 25, 2016

(65) Prior Publication Data
US 2017/0122312 A1 May 4, 2017

(30) Foreign Application Priority Data
Oct. 30, 2015 (JP) .................. 2015-215292

(51) Int. Cl.
F03C 2/00 (2006.01)
F03C 4/00 (2006.01)
(Continued)

(52) U.S. Cl.
CPC .......... F04C 2/348 (2013.01); F01C 21/0809 (2013.01); F01C 21/0836 (2013.01); F01C 21/0863 (2013.01); F04C 2/3446 (2013.01); F04C 13/001 (2013.01); F04C 15/008 (2013.01); F04C 15/0061 (2013.01); F04C 15/06 (2013.01); F04C 29/12 (2013.01); B62D 5/14 (2013.01); F04C 2210/206 (2013.01); F04C 2240/50 (2013.01)

(58) Field of Classification Search
CPC ...... F04C 2/348; F04C 2/3442; F04C 2/3446; F04C 13/001; F04C 15/0061; F04C 15/008; F04C 15/06; F04C 29/12; F04C 2210/206; F04C 2240/50; F01C 21/0809; F01C 21/0863; F01C 21/0836
USPC .............. 418/77, 81–82, 133, 188, 259–260, 418/266–268
See application file for complete search history.

(56) References Cited

U.S. PATENT DOCUMENTS

| | | | | |
|---|---|---|---|---|
| 5,188,522 A | * | 2/1993 | Hara ................... | F01C 21/0863 418/82 |
| 6,648,620 B2 | * | 11/2003 | Yamauchi .......... | F01C 21/0809 418/259 |

(Continued)

FOREIGN PATENT DOCUMENTS

| JP | 2011-196302 A | 10/2011 |
|---|---|---|
| JP | 2013-050067 A | 3/2013 |

*Primary Examiner* — Theresa Trieu
(74) *Attorney, Agent, or Firm* — Leason Ellis LLP

(57) ABSTRACT

An inner-plate cam ring side recess portion is formed in a cam ring side end surface of an inner plate, communicates with a columnar groove which is a center side space in a vane grooves, and supplies a working fluid to the columnar groove. The inner-plate cam ring side recess portion is divided into multiple sections between a first side discharge port, through which the working fluid is discharged at a first discharge pressure from a pump chamber, and a second side suction port through which the working fluid is suctioned into a pump chamber discharging the working fluid at a second discharge pressure. An angle of a separation portion in a rotation direction is smaller than or equal to an angle between the first side discharge port and the second side suction port.

5 Claims, 18 Drawing Sheets

(51) Int. Cl.
*F04C 2/00* (2006.01)
*F04C 2/348* (2006.01)
*F04C 13/00* (2006.01)
*F04C 15/00* (2006.01)
*F04C 15/06* (2006.01)
*F04C 2/344* (2006.01)
*F04C 29/12* (2006.01)
*F01C 21/08* (2006.01)
*B62D 5/14* (2006.01)

(56) References Cited

U.S. PATENT DOCUMENTS

| | | | |
|---|---|---|---|
| 2013/0052071 A1* | 2/2013 | Nishikawa | F01C 21/0863 418/268 |
| 2013/0052073 A1* | 2/2013 | Ishihama | F01C 21/0863 418/268 |

* cited by examiner

ONE SIDE ←→ THE OTHER SIDE

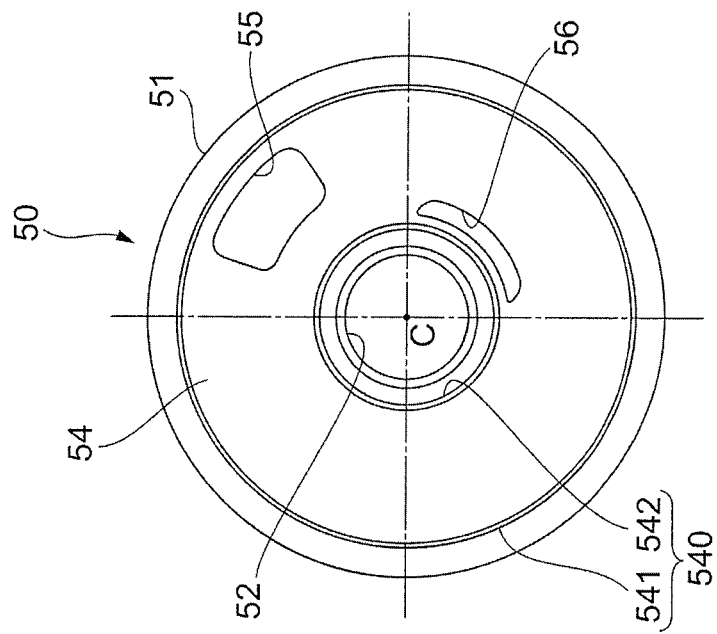
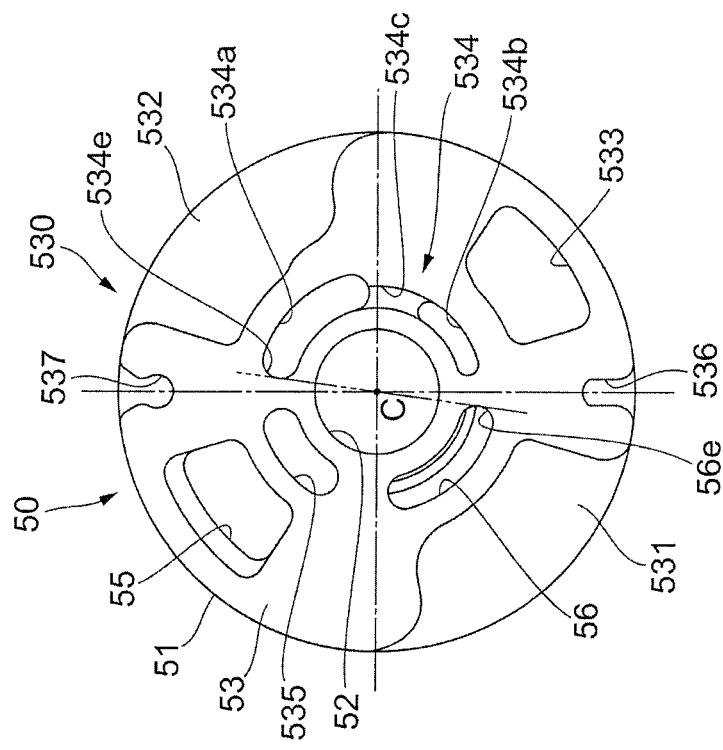

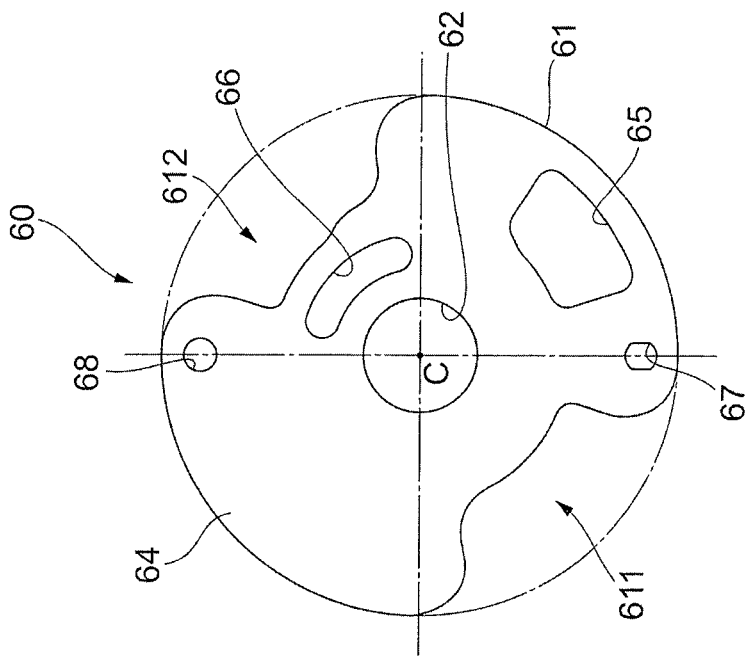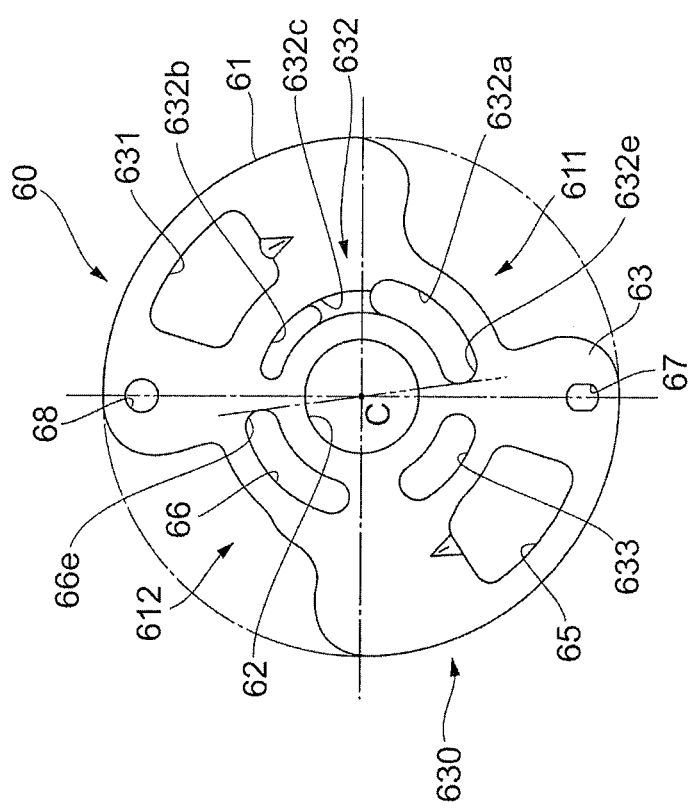

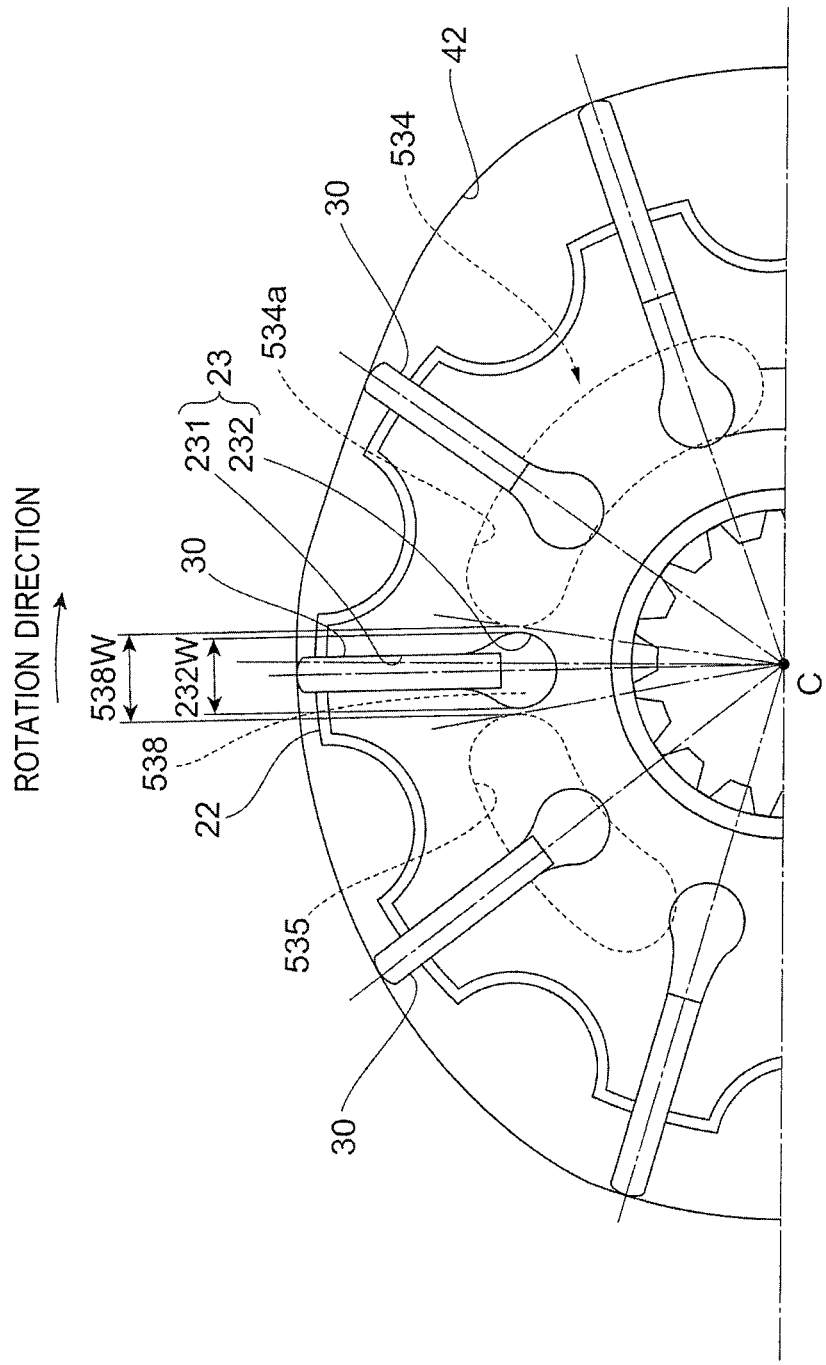

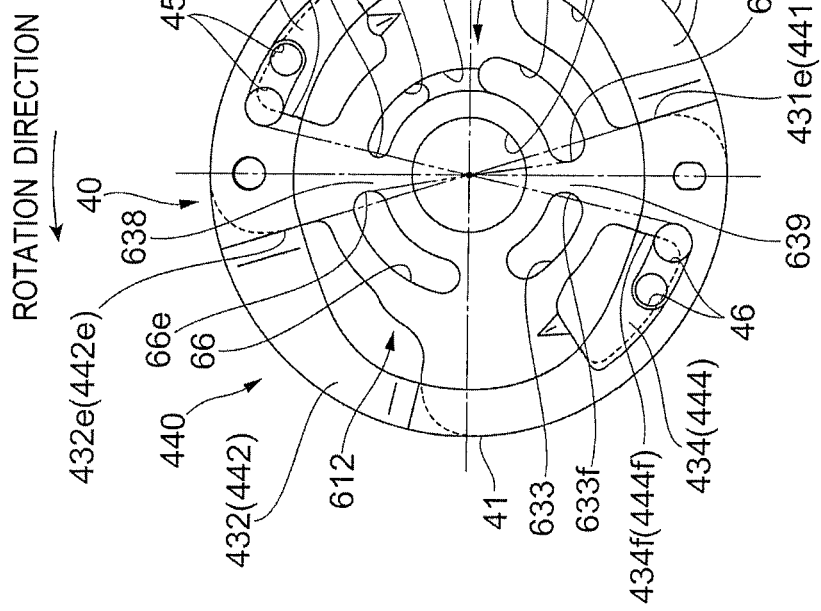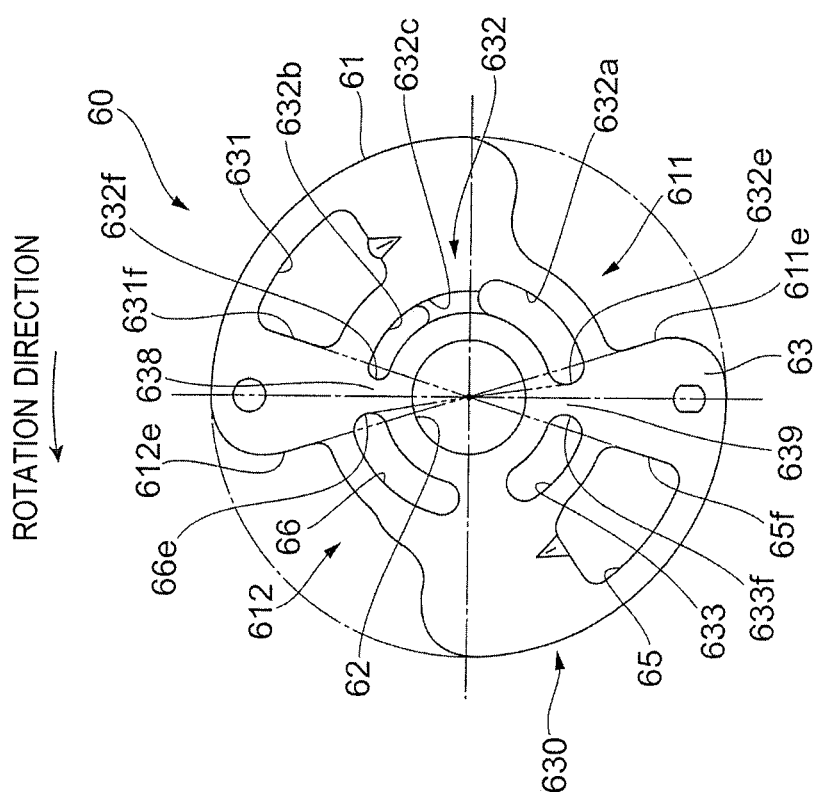

VANE PUMP DEVICE

CROSS-REFERENCE TO RELATED APPLICATION(S)

This application claims priority from Japanese Patent Application No. 2015-215292 filed on Oct. 30, 2015, the entire contents of which are incorporated herein by reference.

BACKGROUND

1. Field

The present invention relates to a vane pump device.

2. Description of Related Art

For example, a vane pump disclosed in JP-A-2013-50067 includes a main discharge port on a high discharge pressure side on which a discharge pressure is high, and a sub discharge port on a low discharge pressure side on which a discharge pressure is low. In this vane pump, two arc-shaped high-pressure oil introduction ports, which introduce high discharge pressure oil of a high pressure chamber to bottom portion side spaces of a portion of vane grooves in a circumferential direction of a rotor, are provided around a center hole of an inner plate so as to face each other on the same diameter of the inner plate. An annular back pressure groove is provided in a surface of an outer plate which is adjacent to the other surface of the rotor, and communicates with bottom portion side spaces of all of the vane grooves of the rotor, and with the high pressure chamber via the high-pressure oil introduction ports of the inner plate. The high-pressure oil introduction ports of the inner plates, communication grooves, and the back pressure groove of the outer plate are set to communicate with the bottom portion side spaces of the vane grooves at any rotational position in a rotation direction of the rotor. Accordingly, during rotation of the rotor, high discharge pressure oil discharged from the discharge port is supplied to the annular back pressure groove of the outer plate via the high-pressure oil introduction ports of the inner plate and then the bottom portion side spaces of a portion of the vane grooves of the rotor, which communicate with the high-pressure oil introduction ports. At the same time the high discharge pressure oil is supplied to the annular back pressure groove of the outer plate, the high discharge pressure oil is introduced to the bottom portion side spaces of all of the vane grooves of the rotor which communicate with the back pressure groove, and the tips of vanes are pushed against and brought into contact with an inner circumferential cam surface of a cam ring by the pressure of the high discharge pressure oil introduced to the bottom portion side spaces of the vane grooves.

JP-A-2011-196302 discloses a vane pump including a switching valve that switches between a full discharge position at which a working fluid is suctioned and discharged in both main and sub regions and a half-discharge position at which the working fluid is suctioned and discharged only in the main region. The switching valve switches the pressure of the working fluid introduced to vanes in the sub region such that the vanes retract to the rotor and move away from the inner circumferential cam surface of the cam ring at the half-discharge position.

In a configuration in which the annular back pressure groove is provided to communicate with the bottom portion side spaces of all of the vane grooves of the rotor and the high pressure chamber, and high discharge pressure oil is introduced to the bottom portion side spaces of the vane grooves via the back pressure groove, the following problems may occur. That is, high discharge pressure oil is introduced to the bottom portion side spaces of the vane grooves, and the hydraulic pressure of a pump chamber on the low discharge pressure side is lower than that of the pump chamber on the high discharge pressure side. As a result, pressure pushing the tips of the vanes against the inner circumferential cam surface of the cam ring is increased, and torque required to drive rotation of the pump is increased.

SUMMARY

An aspect of the present invention provides a vane pump device including: multiple vanes; a rotor that includes vane grooves which are recessed from an outer circumferential surface of the rotor in a rotational radial direction such that the vanes are supported to be movable in the rotational radial direction, and that rotates due to a rotating force received from a rotation shaft; a cam ring that includes an inner circumferential surface facing the outer circumferential surface of the rotor, and is disposed to surround the rotor; one side member disposed on one end portion side of the cam ring in a rotational axial direction to cover an opening of the cam ring; and another side member disposed to face the other end portion side of the cam ring in the rotational axial direction to cover an opening of the cam ring. A recess portion is formed in a cam ring side end surface of at least one of the one side member and the other side member, communicates with a center side space which is a space in the vane grooves on a rotation center side, and supplies a working fluid to the center side space. The recess portion is divided into multiple sections between a first side discharge port, through which the working fluid is discharged at a first discharge pressure from a pump chamber, and a second side suction port through which the working fluid is suctioned into a pump chamber discharging the working fluid at a second discharge pressure, and a rotation angle of a separation portion in the rotation direction is smaller than or equal to an angle between the first side discharge port and the second side suction port.

According to the aspect, it is possible to provide a vane pump device in which torque required to drive rotation of the vane pump device can be reduced.

BRIEF DESCRIPTION OF THE DRAWINGS

FIG. 8A is a view of an inner plate viewed from the one side in the rotational axial direction.

FIG. 8B is a view of the inner plate viewed from the other side in the rotational axial direction.

FIG. 9A is a view of an outer plate viewed from the other side in the rotational axial direction.

FIG. 9B is a view of the outer plate viewed from the one side in the rotational axial direction.

FIG. 15 is a view illustrating the size of an inner-plate low pressure side suction upstream separator in a rotation direction.

FIGS. 16A and 16B are views illustrating a relationship between an outer-plate high pressure side recess portion and an outer-plate low pressure side through-hole, and a relationship between an outer-plate low pressure side recess portion and the outer-plate high pressure side recess portion.

DESCRIPTION OF EMBODIMENTS

Hereinafter, an embodiment will be described in detail with reference to the accompanying drawings.

Figure 1:
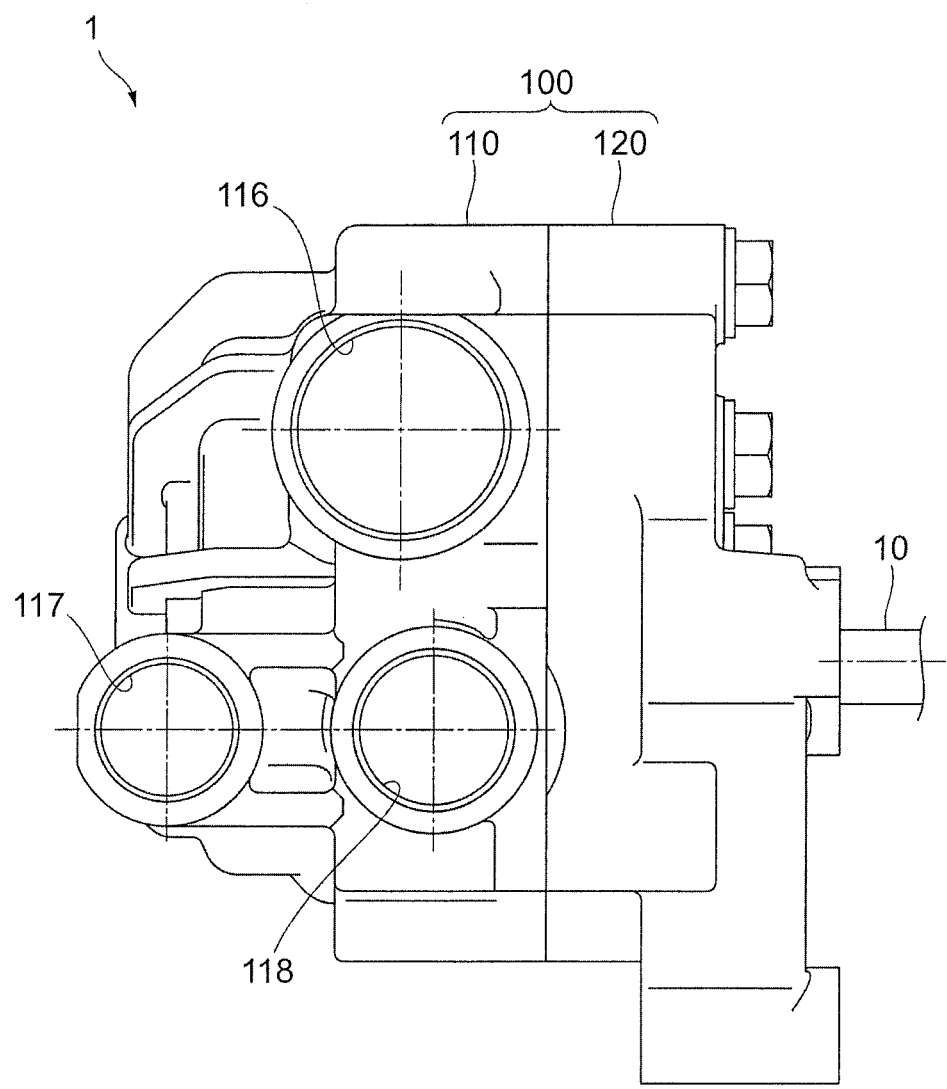
FIG. 1 is an exterior view of a vane pump in an embodiment.

FIG. 1 is an exterior view of a vane pump device 1 (hereinafter, referred to as a "vane pump 1") in the embodiment.

Figure 2:
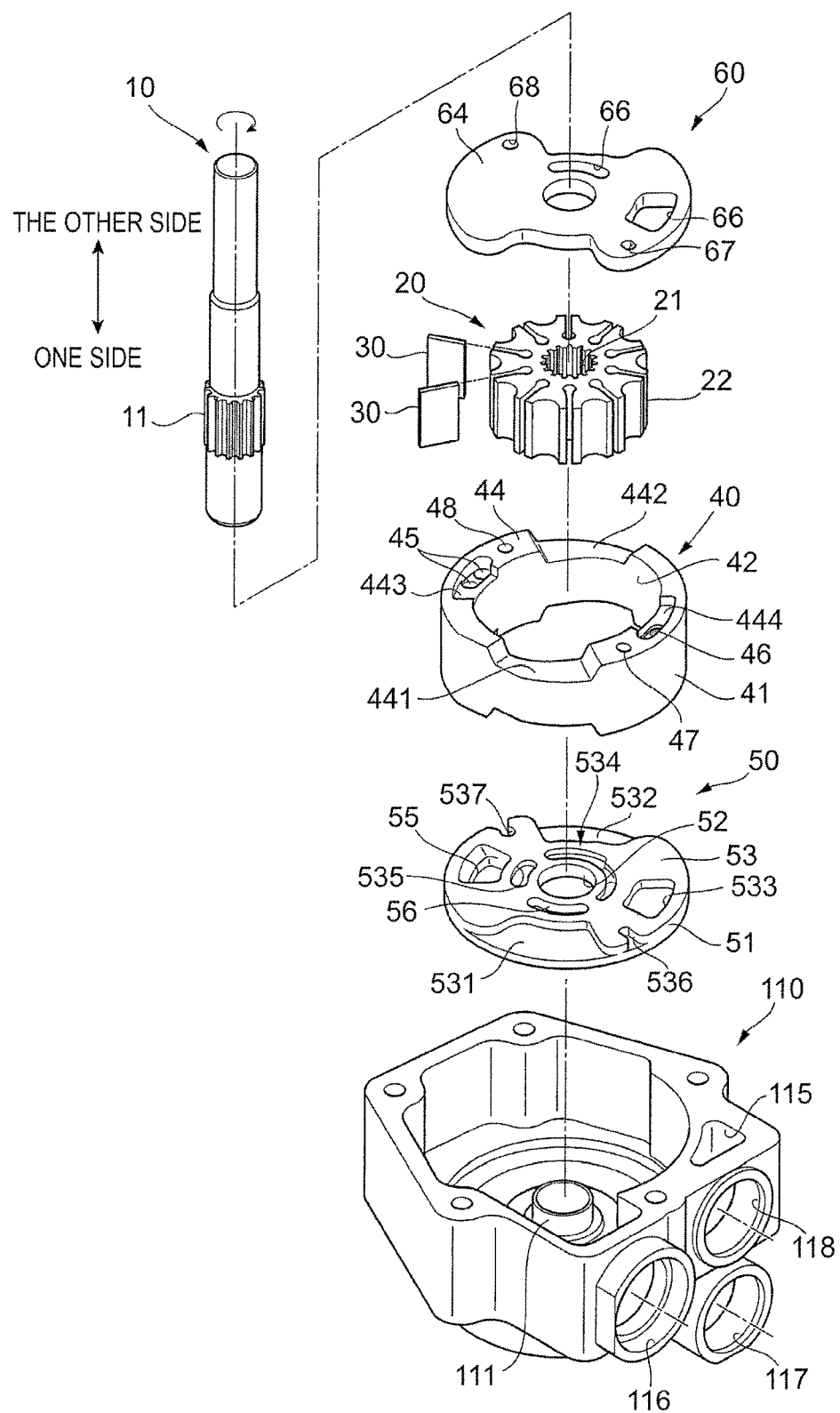
FIG. 2 is a perspective view illustrating a portion of configuration components of the vane pump viewed from a case cover side.

FIG. 2 is a perspective view illustrating a portion of configuration components of the vane pump 1 viewed from a case cover 120 side.

Figure 3:
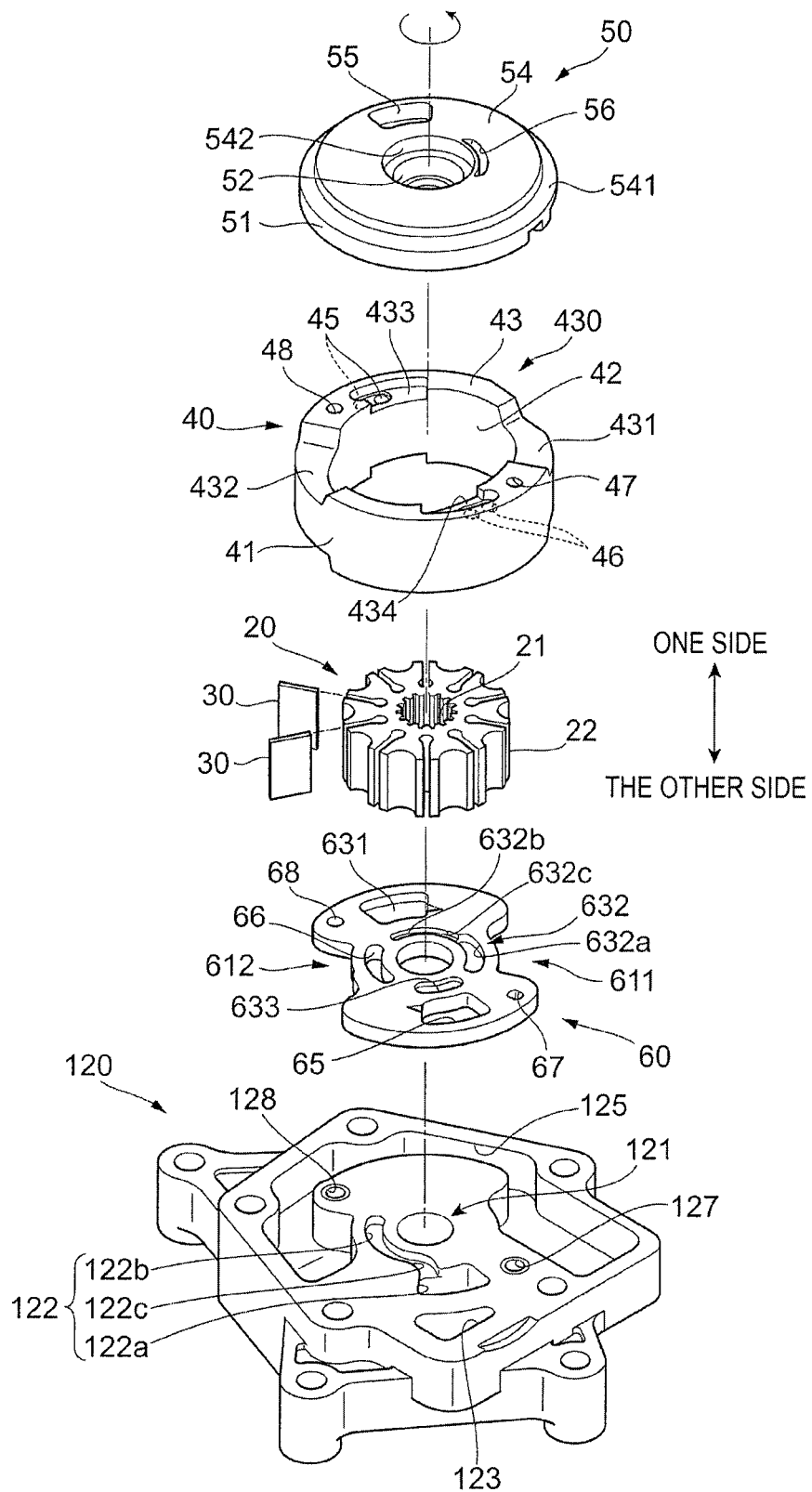
FIG. 3 is a perspective view illustrating a portion of configuration components of the vane pump viewed from a case side.

FIG. 3 is a perspective view illustrating a portion of configuration components of the vane pump 1 viewed from a case 110 side.

Figure 4:
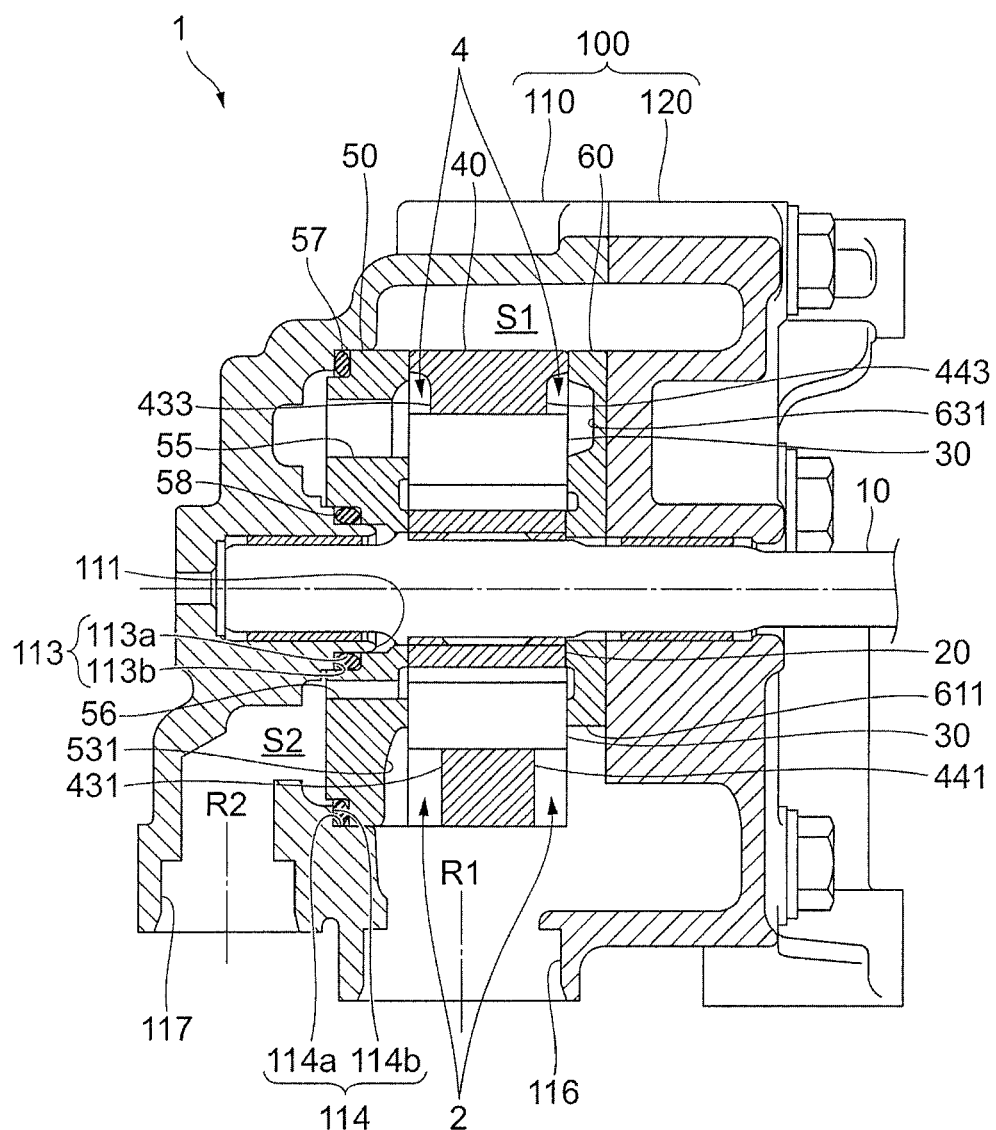
FIG. 4 is a sectional view illustrating a flow path of high pressure oil of the vane pump.
Figure 6A:
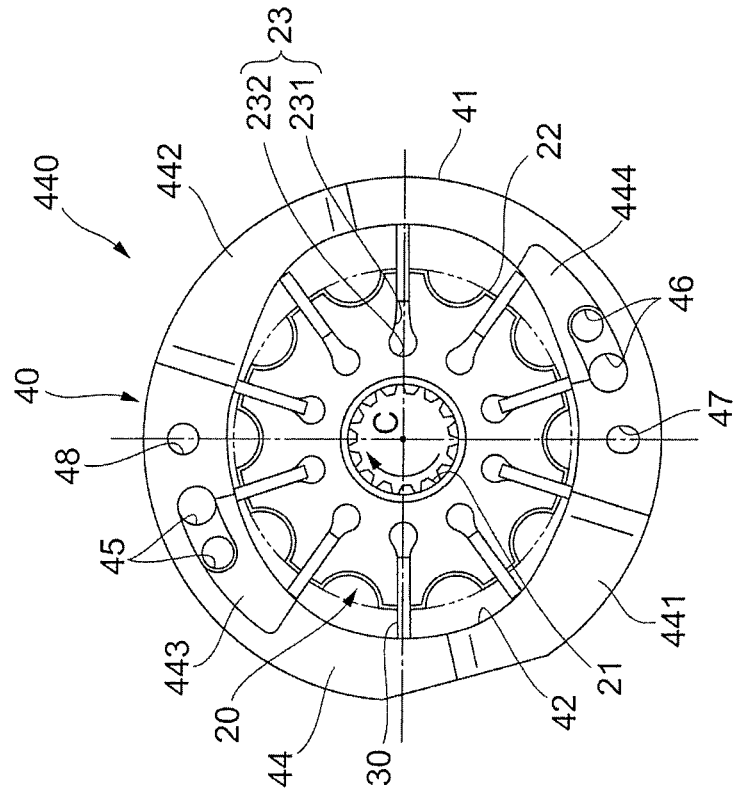
FIG. 6A is a view illustrating a rotor, vanes, and a cam ring viewed from one side in the rotational axial direction.

FIG. 4 is a sectional view illustrating a flow path of high pressure oil of the vane pump 1, and is a sectional view taken along line IV-IV in FIG. 6A.

Figure 5:
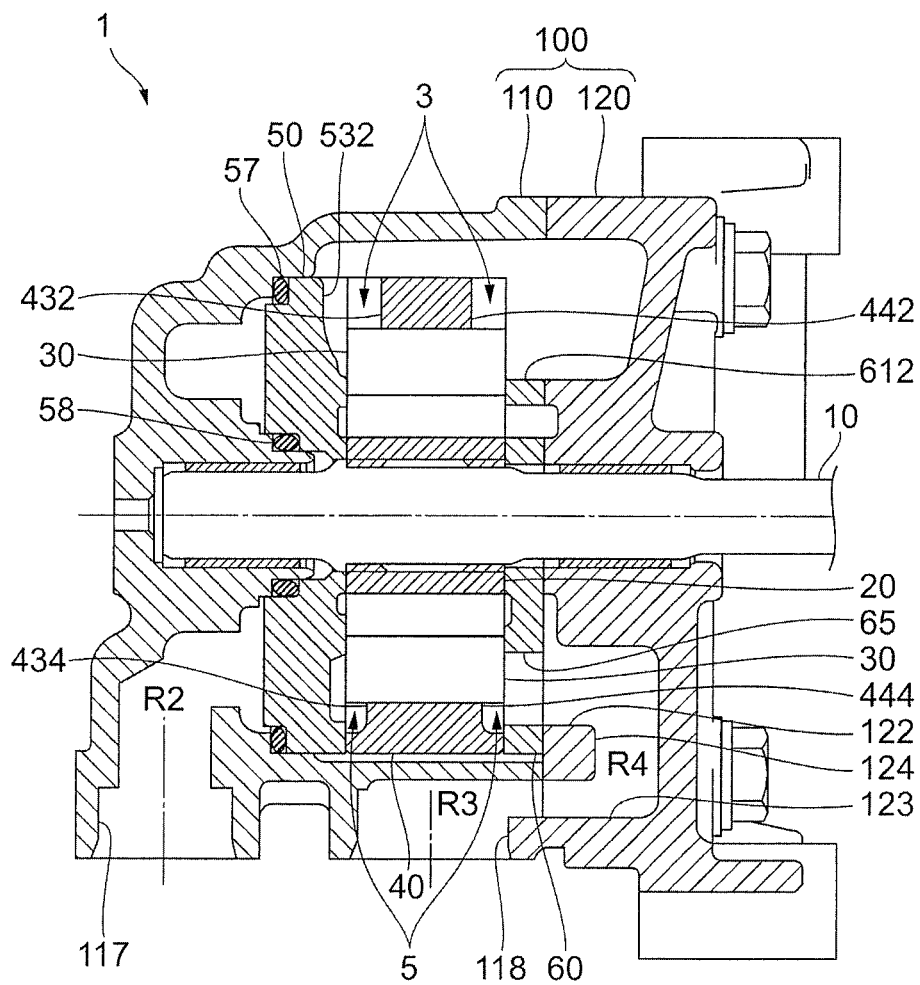
FIG. 5 is a sectional view illustrating a flow path of low pressure oil of the vane pump.

FIG. 5 is a sectional view illustrating a flow path of low pressure oil of the vane pump 1, and is a sectional view taken along line V-V in FIG. 6A.

The vane pump 1 in the embodiment increases the pressure of oil, which is suctioned from one suction port 116, to two different pressures, and discharges oil having a high pressure between the two pressures from a high pressure side discharge port (or first discharge port) 117, and low pressure oil from a low pressure side discharge port (or second discharge port) 118. More specifically, the vane pump 1 in the embodiment increases the pressure of oil inside a pump chamber, which is suctioned from the suction port 116 and then is suctioned into the pump chamber from a high pressure side suction port 2 (refer to FIG. 4), and discharges the pressurized oil from a high pressure side discharge port 4 (refer to FIG. 4) and then to the outside from the high pressure side discharge port 117. In addition, the vane pump 1 increases the pressure of oil inside a pump chamber, which is suctioned from the suction port 116 and then is suctioned into a pump chamber from a low pressure side suction port 3 (refer to FIG. 5), and discharges the pressurized oil from a low pressure side discharge port 5 (refer to FIG. 5) and then to the outside from the low pressure side discharge port 118. The high pressure side suction port 2, the low pressure side suction port 3, the high pressure side discharge port 4, and the low pressure side discharge port 5 are a portion of the vane pump 1 which faces the pump chamber.

In the vane pump 1 of the embodiment, the volume of the pump chamber, to which oil having a high pressure between the two different pressures is suctioned, is smaller than that of the pump chamber to which oil having a low pressure between the two different pressures is suctioned. That is, the high pressure side discharge port 117 discharges a small amount of high pressure oil, and the low pressure side discharge port 118 discharges a large amount of low pressure oil.

The vane pump 1 includes a rotation shaft 10 that rotates due to a drive force received from the engine or a motor of the vehicle; a rotor 20 that rotates along with the rotation shaft 10; multiple vanes 30 that are respectively assembled into grooves formed in the rotor 20; and a cam ring 40 that surrounds an outer circumference of the rotor 20 and the vanes 30.

The vane pump 1 includes an inner plate 50 that is an example of one side member and is disposed closer to one end portion side of the rotation shaft 10 than the cam ring 40, and an outer plate 60 that is an example of another side member and is disposed closer to the other end portion side of the rotation shaft 10 than the cam ring 40.

The vane pump 1 includes a housing 100 that accommodates the rotor 20; the multiple vanes 30; the cam ring 40; the inner plate 50; and the outer plate 60. The housing 100 includes the bottomed cylindrical case 110, and the case cover 120 that covers an opening of the case 110.

Configuration of Rotation Shaft 10

The rotation shaft 10 is rotatably supported by a case bearing 111 (to be described later) provided in the case 110, and a case cover bearing 121 (to be described later) provided in the case cover 120. A spline 11 is formed on an outer circumferential surface of the rotation shaft 10, and the rotation shaft 10 is connected to the rotor 20 via the spline 11. In the embodiment, the rotation shaft 10 receives power from a drive source, for example, the engine of the vehicle, disposed outside of the vane pump 1 such that the rotation shaft 10 rotates and drives rotation of the rotor 20 via the spline 11.

In the vane pump 1 of the embodiment, the rotation shaft 10 (the rotor 20) is configured to rotate in a clockwise direction as illustrated in FIG. 2.

Configuration of Rotor 20

Figure 6B:
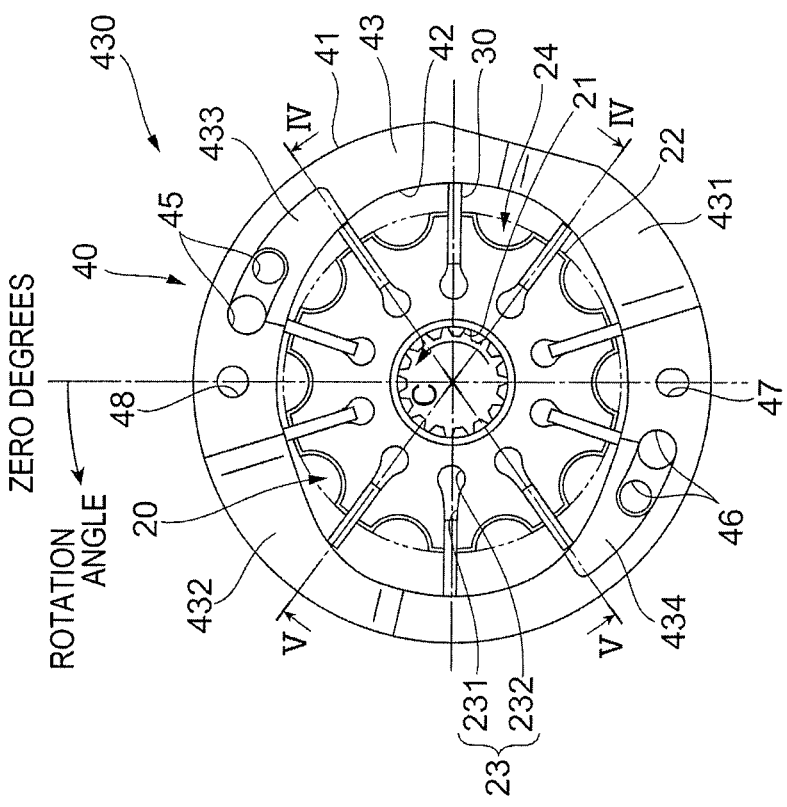
FIG. 6B is a view illustrating the rotor, the vanes, and the cam ring viewed from the other side in the rotational axial direction.

FIG. 6A is a view illustrating the rotor 20, the vanes 30, and the cam ring 40 viewed from one side in the rotational axial direction. FIG. 6B is a view illustrating the rotor 20, the vanes 30, and the cam ring 40 viewed from the other side in the rotational axial direction.

The rotor 20 is a substantially cylindrical member. A spline 21 is formed on an inner circumferential surface of the rotor 20, and is fitted to the spline 11 of the rotation shaft 10. Multiple (10 in the embodiment) vane grooves 23 accommodating the vanes 30 are formed in an outer circumferential portion of the rotor 20 such that the multiple vane grooves 23 are recessed from an outermost circumferential surface 22 toward a rotation center and are equally spaced apart from each other in a circumferential direction (radially). A recess portion 24 is formed in the outer circumferential portion of the rotor 20 such that the recess portion 24 is recessed from the outermost circumferential surface 22 toward the rotation center and is disposed between two adjacent vane grooves 23.

Each of the vane grooves 23 is a groove that opens in the outermost circumferential surface 22 of the rotor 20 and both end surfaces in the rotational axial direction of the rotation shaft 10. As illustrated in FIGS. 6A and 6B, when viewed in the rotational axial direction, an outer circumferential portion side of the vane groove 23 has a rectangular shape in which the rotational radial direction coincides with a longitudinal direction of the rectangular shape, and a portion of the vane groove 23 close to the rotation center has a circular shape having a diameter larger than the length of the rectangular shape in a lateral direction of the rectangular shape. That is, the vane groove 23 includes a rectangular parallelepiped groove 231 that is formed into a rectangular parallelepiped shape on the outer circumferential portion side, and a columnar groove 232 as an example of a center side space which is formed into a columnar shape and is positioned close to the rotation center.

Configuration of Vane 30

The vane 30 is a rectangular parallelepiped member, and the vanes 30 are respectively assembled into the vane grooves 23 of the rotor 20. The length of the vane 30 in the rotational radial direction is shorter than that of the vane groove 23 in the rotational radial direction, and the width of the vane 30 is narrower than that of the vane groove 23. The vane 30 is held in the vane groove 23 such that the vane 30 is capable of moving in the rotational radial direction.

Configuration of Cam Ring 40

The cam ring 40 has a substantially cylindrical member, and includes an outer circumferential cam ring surface 41; an inner circumferential cam ring surface 42; an inner end surface 43 that is an end surface positioned toward the inner plate 50 in the rotational axial direction; and an outer end surface 44 that is an end surface positioned toward the outer plate 60 in the rotational axial direction.

As illustrated in FIGS. 6A and 6B, when viewed in the rotational axial direction, the outer circumferential cam ring surface 41 has a substantially circular shape in which a distance from the rotation center to any point on the entire circumference (excluding a portion of the circumference) is substantially the same.

Figure 7:
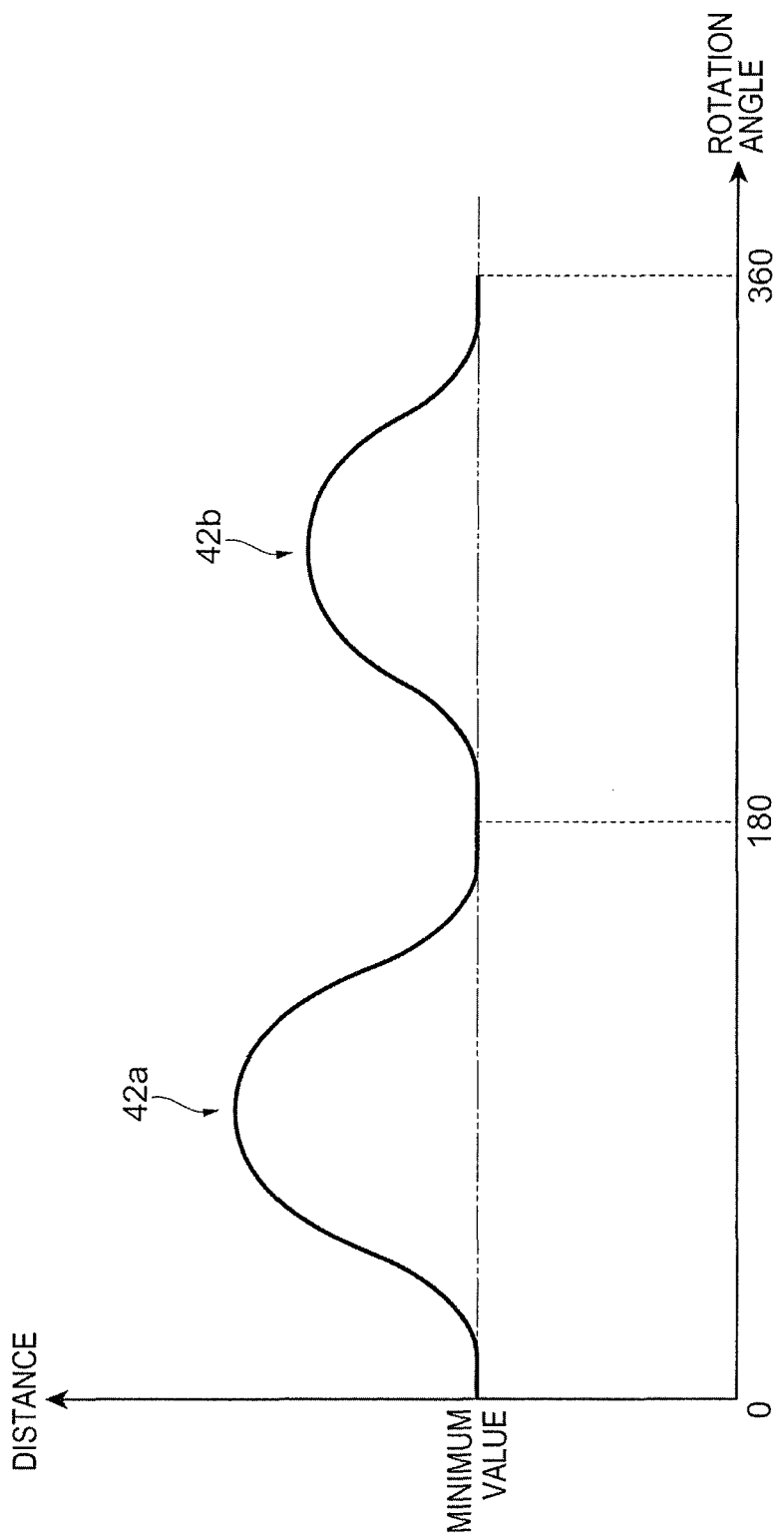
FIG. 7 is a graph illustrating a distance from a rotation center to an inner circumferential cam ring surface of the cam ring at each rotational angular position.

FIG. 7 is a graph illustrating a distance from the rotation center to the inner circumferential cam ring surface 42 of the cam ring 40 at each rotational angular position.

As illustrated in FIG. 7, when viewed in the rotational axial direction, the inner circumferential cam ring surface 42 of the cam ring 40 is formed to have two protrusions, of which the distance (in other words, the amount of protrusion of the vane 30 from the vane groove 23) from a rotation center C (refer to FIG. 6) is different from that at other rotational angular positions. That is, in a case where a positive vertical axis in FIG. 6A is assumed to be positioned at zero degrees, the distance from the rotation center C is set such that a first protrusion 42a is formed by gradually increasing the distance in a range between approximately 20 degrees and approximately 90 degrees in a counterclockwise direction and gradually decreasing the distance in a range between approximately 90 degrees and approximately 160 degrees, and a second protrusion 42b is formed by gradually increasing the distance in a range between approximately 200 degrees and approximately 270 degrees and gradually decreasing the distance in a range between approximately 270 degrees and approximately 340 degrees. As illustrated in FIG. 7, in the cam ring 40 of the embodiment, the distance from the rotation center C at each rotational angular position is set such that the amount of protrusion of the first protrusion 42a is greater than that of the second protrusion 42b. In addition, the distance from the rotation center C at each rotational angular position is set such that a base of the second protrusion 42b is smoother than that of the first protrusion 42a. That is, a change of the distance from the rotation center C to the base of the second protrusion 42b at each rotational angular position is less than a change of the distance from the rotation center C to the base of the first protrusion 42a at each rotational angular position. The distance from the rotation center C to portions other than the protrusions is set to be the minimum value. The minimum value is set to be slightly greater than the distance from the rotation center C to the outermost circumferential surface 22 of the rotor 20.

As illustrated in FIG. 6A, the cam ring 40 includes an inner recess portion 430 made up of multiple recess portions which are recessed from the inner end surface 43. As illustrated in FIG. 6B, the cam ring 40 includes an outer recess portion 440 made up of multiple recess portions which are recessed from the outer end surface 44.

As illustrated in FIG. 6A, the inner recess portion 430 includes a high pressure side suction recess portion 431 forming the high pressure side suction port 2; a low pressure side suction recess portion 432 forming the low pressure side suction port 3; a high pressure side discharge recess portion 433 forming the high pressure side discharge port 4; and a low pressure side discharge recess portion 434 forming the low pressure side discharge port 5. When viewed in the rotational axial direction, the high pressure side suction recess portion 431 and the low pressure side suction recess portion 432 are formed to be point-symmetrical with each other with respect to the rotation center C, and the high pressure side discharge recess portion 433 and the low pressure side discharge recess portion 434 are formed to be point-symmetrical with each other with respect to the rotation center C. The high pressure side suction recess portion 431 and the low pressure side suction recess portion 432 are recessed over the entire region of the inner end surface 43 in the rotational radial direction. In addition, the high pressure side suction recess portion 431 and the low pressure side suction recess portion 432 are recessed from the inner end surface 43 at a predetermined angle in the circumferential direction. The high pressure side discharge recess portion 433 and the low pressure side discharge recess portion 434 are recessed from a predetermined region of the inner end surface 43 in the rotational radial direction which is positioned between the inner circumferential cam ring surface 42 and the outer circumferential cam ring surface 41. In addition, the high pressure side discharge recess portion 433 and the low pressure side discharge recess portion 434 are recessed from the inner end surface 43 at a predetermined angle in the circumferential direction.

As illustrated in FIG. 6B, the outer recess portion 440 includes a high pressure side suction recess portion 441 forming the high pressure side suction port 2; a low pressure side suction recess portion 442 forming the low pressure side suction port 3; a high pressure side discharge recess portion 443 forming the high pressure side discharge port 4; and a low pressure side discharge recess portion 444 forming the low pressure side discharge port 5. When viewed in the rotational axial direction, the high pressure side suction recess portion 441 and the low pressure side suction recess portion 442 are formed to be point-symmetrical with each other with respect to the rotation center C, and the high pressure side discharge recess portion 443 and the low pressure side discharge recess portion 444 are formed to be point-symmetrical with each other with respect to the rotation center C. The high pressure side suction recess portion 441 and the low pressure side suction recess portion 442 are recessed over the entire region of the outer end surface 44 in the rotational radial direction. In addition, the high pressure side suction recess portion 441 and the low pressure side suction recess portion 442 are recessed from the outer end surface 44 at a predetermined angle in the circumferential direction. The high pressure side discharge recess portion 443 and the low pressure side discharge recess portion 444 are recessed from a predetermined region of the outer end surface 44 in the rotational radial direction which is positioned between the inner circumferential cam ring surface 42 and the outer circumferential cam ring surface 41. In addition, the high pressure side discharge recess portion 443 and the low pressure side discharge recess portion 444 are recessed from the outer end surface 44 at a predetermined angle in the circumferential direction.

When viewed in the rotational axial direction, the high pressure side suction recess portion 431 and the high pressure side suction recess portion 441 are provided at the same position, and the low pressure side suction recess portion 432 and the low pressure side suction recess portion 442 are provided at the same position. In a case where the positive vertical axis in FIG. 6A is assumed to be positioned at zero degrees, the low pressure side suction recess portion 432 and the low pressure side suction recess portion 442 are provided in a range between approximately 20 degrees and approximately 90 degrees in the counterclockwise direction, and the high pressure side suction recess portion 431 and the high pressure side suction recess portion 441 are provided in a range between approximately 200 degrees and approximately 270 degrees.

When viewed in the rotational axial direction, the high pressure side discharge recess portion 433 and the high pressure side discharge recess portion 443 are provided at the same position, and the low pressure side discharge recess portion 434 and the low pressure side discharge recess portion 444 are provided at the same position. In a case where the positive vertical axis in FIG. 6A is assumed to be positioned at zero degrees, the low pressure side discharge recess portion 434 and the low pressure side discharge recess portion 444 are provided in a range between approximately 130 degrees and approximately 175 degrees in the counterclockwise direction, and the high pressure side discharge recess portion 433 and the high pressure side discharge recess portion 443 are provided in a range between approximately 310 degrees and approximately 355 degrees.

Two high pressure side discharge through-holes 45 are formed to pass through the cam ring 40 in the rotational axial direction such that the high pressure side discharge recess portion 433 communicates with the high pressure side discharge recess portion 443 via the two high pressure side discharge through-holes 45. Two low pressure side discharge through-holes 46 are formed to pass through the cam ring 40 in the rotational axial direction such that the low pressure side discharge recess portion 434 communicates with the low pressure side discharge recess portion 444 via the two low pressure side discharge through-holes 46.

A first through-hole 47 is formed to pass through the cam ring 40 in the rotational axial direction such that the inner end surface 43 between the high pressure side suction recess portion 431 and the low pressure side discharge recess portion 434 communicates with the outer end surface 44 between the high pressure side suction recess portion 441 and the low pressure side discharge recess portion 444 via the first through-hole 47. In addition, a second through-hole 48 is formed to pass through the cam ring 40 in the rotational axial direction such that the inner end surface 43 between the low pressure side suction recess portion 432 and the high pressure side discharge recess portion 433 communicates with the outer end surface 44 between the low pressure side suction recess portion 442 and the high pressure side discharge recess portion 443 via the second through-hole 48.

Configuration of Inner Plate 50

FIG. 8A is a view of the inner plate 50 viewed from the one side in the rotational axial direction. FIG. 8B is a view of the inner plate 50 viewed from the other side in the rotational axial direction.

The inner plate 50 is a substantially disc-shaped member that includes a through-hole at a central portion. The inner plate 50 includes an inner-plate outer circumferential surface 51; an inner-plate inner circumferential surface 52; an inner-plate cam ring side end surface 53, that is, an end surface that is positioned to face the cam ring 40 in the rotational axial direction; and an inner-plate non-cam ring side end surface 54, that is, an end surface that is positioned not to face the cam ring 40 in the rotational axial direction.

As illustrated in FIGS. 8A and 8B, when viewed in the rotational axial direction, the inner-plate outer circumferential surface 51 has a circular shape, and a distance from the rotation center C to the inner-plate outer circumferential surface 51 is substantially the same as that from the rotation center C to the outer circumferential cam ring surface 41 of the cam ring 40.

As illustrated in FIGS. 8A and 8B, when viewed in the rotational axial direction, the inner-plate inner circumferential surface 52 has a circular shape, and a distance from the rotation center C to the inner-plate inner circumferential surface 52 is substantially the same as that from the rotation center C to a groove bottom of the spline 21 formed on the inner circumferential surface of the rotor 20.

The inner plate 50 includes an inner-plate cam ring side recess portion 530 made up of multiple recess portions which are recessed from the inner-plate cam ring side end surface 53, and an inner-plate non-cam ring side recess portion 540 made up of multiple recess portions which are recessed from the inner-plate non-cam ring side end surface 54.

The inner-plate cam ring side recess portion 530 includes a high pressure side suction recess portion 531 that is formed to face the high pressure side suction recess portion 431 of the cam ring 40 and forms the high pressure side suction port 2. In addition, the inner-plate cam ring side recess portion 530 includes a low pressure side suction recess portion 532 that is formed to face the low pressure side suction recess portion 432 of the cam ring 40 and forms the low pressure side suction port 3. The high pressure side suction recess portion 531 and the low pressure side suction recess portion 532 are formed to be point-symmetrical with each other with respect to the rotation center C.

The inner-plate cam ring side recess portion 530 includes a low pressure side discharge recess portion 533 that is formed to face the low pressure side discharge recess portion 434 of the cam ring 40.

The inner-plate cam ring side recess portion 530 includes an inner-plate low pressure side recess portion 534 that is positioned to correspond to a circumferential range from the low pressure side suction recess portion 532 to the low pressure side discharge recess portion 533, and to face the columnar groove 232 of the vane groove 23 of the rotor 20 in the rotational radial direction. The inner-plate low pressure side recess portion 534 includes a low pressure side upstream recess portion 534a that is positioned to correspond to the low pressure side suction recess portion 532 in the circumferential direction; a low pressure side downstream recess portion 534b that is positioned to correspond to the low pressure side discharge recess portion 533 in the circumferential direction; and a low pressure side connection recess portion 534c through which the low pressure side upstream recess portion 534a is connected to the low pressure side downstream recess portion 534b.

The inner-plate cam ring side recess portion 530 includes an inner-plate high pressure side recess portion 535 that is positioned to correspond to the high pressure side discharge recess portion 433 in the circumferential direction, and to face the columnar groove 232 of the vane groove 23 of the rotor 20 in the rotational radial direction.

The inner-plate cam ring side recess portion 530 includes a first part 536 that is formed to face the first through-hole 47 of the cam ring 40, and a second part 537 that is formed to face the second through-hole 48.

The inner-plate non-cam ring side recess portion 540 includes an outer circumferential groove 541 which is formed in an outer circumferential portion of the inner-plate non-cam ring side end surface 54, and into which an outer circumferential O-ring 57 is fitted. In addition, the inner-plate non-cam ring side recess portion 540 includes an inner circumferential groove 542 which is formed in an inner circumferential portion of the inner-plate non-cam ring side end surface 54, and into which an inner circumferential O-ring 58 is fitted. The outer circumferential O-ring 57 and the inner circumferential O-ring 58 seal a gap between the inner plate 50 and the case 110.

A high pressure side discharge through-hole 55 is formed to pass through the inner plate 50 in the rotational axial direction, and is positioned to face the high pressure side discharge recess portion 443 of the cam ring 40. A cam ring 40 side opening of the high pressure side discharge through-hole 55 and an opening of the low pressure side discharge recess portion 533 are formed to be point-symmetrical with each other with respect to the rotation center C.

An inner-plate high pressure side through-hole 56 (or a first recess portion) is formed to pass through the inner plate 50 in the rotational axial direction such that the inner-plate high pressure side through-hole 56 is positioned to correspond to the high pressure side suction recess portion 531 in the circumferential direction and to face the columnar groove 232 of the vane groove 23 of the rotor 20 in the rotational radial direction.

FIG. 9A is a view of the outer plate 60 viewed from the other side in the rotational axial direction. FIG. 9B is a view of the outer plate 60 viewed from the one side in the rotational axial direction.

The outer plate 60 is a substantially plate-like member that includes a through-hole at a central portion. The outer plate 60 includes an outer-plate outer circumferential surface 61; an outer-plate inner circumferential surface 62; an outer-plate cam ring side end surface 63, that is, an end surface that is positioned to face the cam ring 40 in the rotational axial direction; and an outer-plate non-cam ring side end surface 64, that is, an end surface that is positioned not to face the cam ring 40 in the rotational axial direction.

As illustrated in FIGS. 9A and 9B, when viewed in the rotational axial direction, the outer-plate outer circumferential surface 61 has a shape in which two portions are cut out from a circular base of the outer-plate outer circumferential surface 61. A distance from the rotation center C to the circular base is substantially the same as that from the rotation center C to the outer circumferential cam ring surface 41 of the cam ring 40. Two cut-outs include a high pressure side suction cut-out 611 that is formed to face the high pressure side suction recess portion 441 and forms the high pressure side suction port 2, and a low pressure side suction cut-out 612 that is formed to face the low pressure side suction recess portion 442 and forms the low pressure side suction port 3. The outer-plate outer circumferential surfaces 61 are formed to be point-symmetrical with each other with respect to the rotation center C. The high pressure side suction cut-out 611 and the low pressure side suction cut-out 612 are formed to be point-symmetrical with each other with respect to the rotation center C.

As illustrated in FIGS. 9A and 9B, when viewed in the rotational axial direction, the outer-plate inner circumferential surface 62 has a circular shape, and a distance from the rotation center C to the outer-plate inner circumferential surface 62 is substantially the same as that from the rotation center C to the groove bottom of the spline 21 formed on the inner circumferential surface of the rotor 20.

The outer plate 60 includes an outer-plate cam ring side recess portion 630 made up of multiple recess portions which are recessed from the outer-plate cam ring side end surface 63.

The outer-plate cam ring side recess portion 630 includes a high pressure side discharge recess portion 631 that is formed to face the high pressure side discharge recess portion 443 of the cam ring 40.

The outer-plate cam ring side recess portion 630 includes an outer-plate high pressure side recess portion 632 that is positioned to correspond to a circumferential range from the high pressure side suction cut-out 611 to the high pressure side discharge recess portion 631, and to face the columnar groove 232 of the vane groove 23 of the rotor 20 in the rotational radial direction. The outer-plate high pressure side recess portion 632 includes a high pressure side upstream recess portion 632a that is positioned to correspond to the high pressure side suction cut-out 611 in the circumferential direction; a high pressure side downstream recess portion 632b that is positioned to correspond to the high pressure side discharge recess portion 631 in the circumferential direction; and a high pressure side connection recess portion 632c through which the high pressure side upstream recess portion 632a is connected to the high pressure side downstream recess portion 632b.

The outer-plate cam ring side recess portion 630 includes an outer-plate low pressure side recess portion 633 that is positioned to correspond to the low pressure side discharge recess portion 444 of the cam ring 40 in the circumferential direction, and to face the columnar groove 232 of the vane groove 23 of the rotor 20 in the rotational radial direction.

A low pressure side discharge through-hole 65 is formed to pass through the outer plate 60 in the rotational axial direction, and is positioned to face the low pressure side discharge recess portion 444 of the cam ring 40. A cam ring 40 side opening of the low pressure side discharge through-hole 65 and an opening of the high pressure side discharge recess portion 631 are formed to be point-symmetrical with each other with respect to the rotation center C.

An outer-plate low pressure side through-hole 66 (or a second recess portion) is formed to pass through the outer plate 60 in the rotational axial direction such that the outer-plate low pressure side through-hole 66 is positioned to correspond to the low pressure side suction cut-out 612 in the circumferential direction and to face the columnar groove 232 of the vane groove 23 of the rotor 20 in the rotational radial direction.

A first through-hole 67 is formed to pass through the outer plate 60 in the rotational axial direction, and is positioned to face the first through-hole 47 of the cam ring 40. A second through-hole 68 is formed to pass through the outer plate 60 in the rotational axial direction, and is positioned to face the second through-hole 48 of the cam ring 40.

Configuration of Housing 100

The housing 100 accommodates the rotor 20; the vanes 30; the cam ring 40; the inner plate 50; and the outer plate 60. One end portion of the rotation shaft 10 is accommodated in the housing 100, and the other end portion of the rotation shaft 10 protrudes from the housing 100.

The case 110 and the case cover 120 are tightened together with bolts.

Configuration of Case 110

Figure 10:
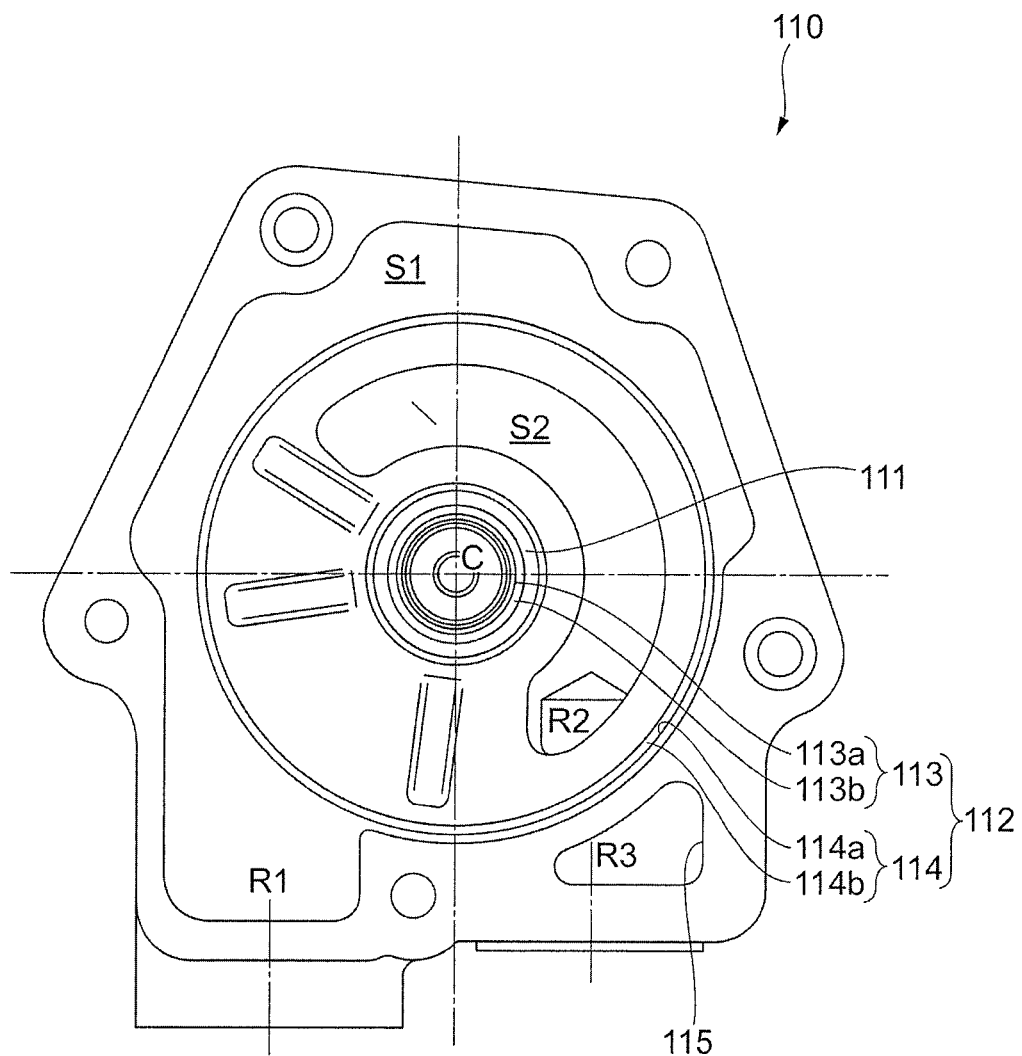
FIG. 10 is a view of a case viewed from the one side in the rotational axial direction.

FIG. 10 is a view of the case 110 viewed from the one side in the rotational axial direction.

The case 110 is a bottomed cylindrical member. The case bearing 111 is provided in a central portion of a bottom portion of the case 110, and rotatably supports the one end portion of the rotation shaft 10.

The case 110 includes an inner plate fitting portion 112 to which the inner plate 50 is fitted. The inner plate fitting portion 112 includes an inner-diameter side fitting portion 113 that is positioned close to the rotation center C (inner diameter side), and an outer-diameter side fitting portion 114 that is positioned apart from the rotation center C (outer diameter side).

As illustrated in FIG. 4, the inner-diameter side fitting portion 113 is provided on an outer diameter side of the case bearing 111. The inner-diameter side fitting portion 113 includes an inner-diameter side cover portion 113a that covers the vicinity of a portion of the inner-plate inner circumferential surface 52 of the inner plate 50, and an inner-diameter side preventive portion 113b that prevents movement of the inner plate 50 to the bottom portion. When viewed in the rotational axial direction, the inner-diameter side cover portion 113a has a circular shape in which a distance from the rotation center C to the inner-diameter side cover portion 113a is shorter than that from the rotation center C to the inner-plate inner circumferential surface 52. The inner-diameter side preventive portion 113b is a donut-shaped surface perpendicular to the rotational axial direction. A distance from the rotation center C to an inner circle of the inner-diameter side preventive portion 113b is the same as that from the rotation center C to the inner-diameter side cover portion 113a. A distance from the rotation center C to an outer circle of the inner-diameter side preventive portion 113b is shorter than that from the rotation center C to the inner-plate inner circumferential surface 52.

As illustrated in FIG. 4, the outer-diameter side fitting portion 114 includes an outer-diameter side cover portion 114a that covers the vicinity of a portion of the inner-plate outer circumferential surface 51 of the inner plate 50, and an outer-diameter side preventive portion 114b that prevents movement of the inner plate 50 to the bottom portion. When viewed in the rotational axial direction, the outer-diameter side cover portion 114a has a circular shape in which a distance from the rotation center C to the outer-diameter side cover portion 114a is longer than that from the rotation center C to the inner-plate outer circumferential surface 51. The outer-diameter side preventive portion 114b is a donut-shaped surface perpendicular to the rotational axial direction. A distance from the rotation center C to an outer circle of the outer-diameter side preventive portion 114b is the same as that from the rotation center C to the outer-diameter side cover portion 114a. A distance from the rotation center C to an inner circle of the outer-diameter side preventive portion 114b is shorter than that from the rotation center C to the inner-plate outer circumferential surface 51.

The inner plate 50 is inserted into the bottom portion until the inner circumferential O-ring 58, which is fitted into the inner circumferential groove 542 of the inner plate 50, comes into contact with the inner-diameter side preventive portion 113b and the outer circumferential O-ring 57, which is fitted into the outer circumferential groove 541, comes into contact with the outer-diameter side preventive portion 114b. The inner circumferential O-ring 58 is in contact with the inner circumferential groove 542 of the inner plate 50, and the inner-diameter side cover portion 113a and the inner-diameter side preventive portion 113b of the case 110. The outer circumferential O-ring 57 is in contact with the outer circumferential groove 541 of the inner plate 50, and the outer-diameter side cover portion 114a and the outer-diameter side preventive portion 114b of the case 110. Accordingly, a gap between the case 110 and the inner plate 50 is sealed. As a result, an inner space of the case 110 is divided into a space S1 further on the opening side of the inner plate fitting portion 112, and a bottom portion side space S2 positioned below the inner plate fitting portion 112. The opening side space S1, which is positioned above the inner plate fitting portion 112, forms a suction passage R1 of oil that is suctioned from the high pressure side suction port 2 and the low pressure side suction port 3. The bottom portion side space S2, which is positioned below the inner plate fitting portion 112, forms a high pressure side discharge passage R2 of oil that is discharged from the high pressure side discharge port 4.

Separately from an accommodation space in which the rotor 20, the vanes 30, the cam ring 40, the inner plate 50, and the outer plate 60 are accommodated, the case 110 includes a case outer recess portion 115 that is positioned outside of the accommodating space in the rotational radial direction, and that is recessed from an opening side in the rotational axial direction. The case outer recess portion 115 faces a case cover outer recess portion 123 (to be described later) formed in the case cover 120, and forms a case low pressure side discharge-passage R3 of oil that is discharged from the low pressure side discharge port 5.

As illustrated in FIGS. 1 and 2, the case 110 includes the suction port 116 that communicates with the opening side space S1 positioned above the inner plate fitting portion 112, and with the outside of the case 110. The suction port 116 is configured to include a columnar hole formed in a side wall of the case 110, of which a columnar direction is perpendicular to the rotational axial direction. The suction port 116 forms the suction passage R1 of oil that is suctioned from the high pressure side suction port 2 and the low pressure side suction port 3.

As illustrated in FIGS. 1 and 2, the case 110 includes the high pressure side discharge port 117 that communicates with the bottom portion side space S2 positioned below the inner plate fitting portion 112, and with the outside of the case 110. The high pressure side discharge port 117 is configured to include a columnar hole formed in the side wall of the case 110, of which a columnar direction is perpendicular to the rotational axial direction. The high pressure side discharge port 117 forms the high pressure side discharge passage R2 of oil that is discharged from the high pressure side discharge port 4.

As illustrated in FIGS. 1 and 2, the case 110 includes the low pressure side discharge port 118 that communicates with the case outer recess portion 115 and the outside of the case 110. The low pressure side discharge port 118 is configured to include a columnar hole formed in a side wall of the case outer recess portion 115 of the case 110, of which a columnar direction is perpendicular to the rotational axial direction. The low pressure side discharge port 118 forms the low pressure side discharge passage R3 of oil that is discharged from the low pressure side discharge port 5.

In the case 110 of the embodiment, the directions (columnar directions) of the respective columnar holes of the suction port 116, the high pressure side discharge port 117, and the low pressure side discharge port 118 are the same.

Configuration of Case Cover 120

Figure 11:
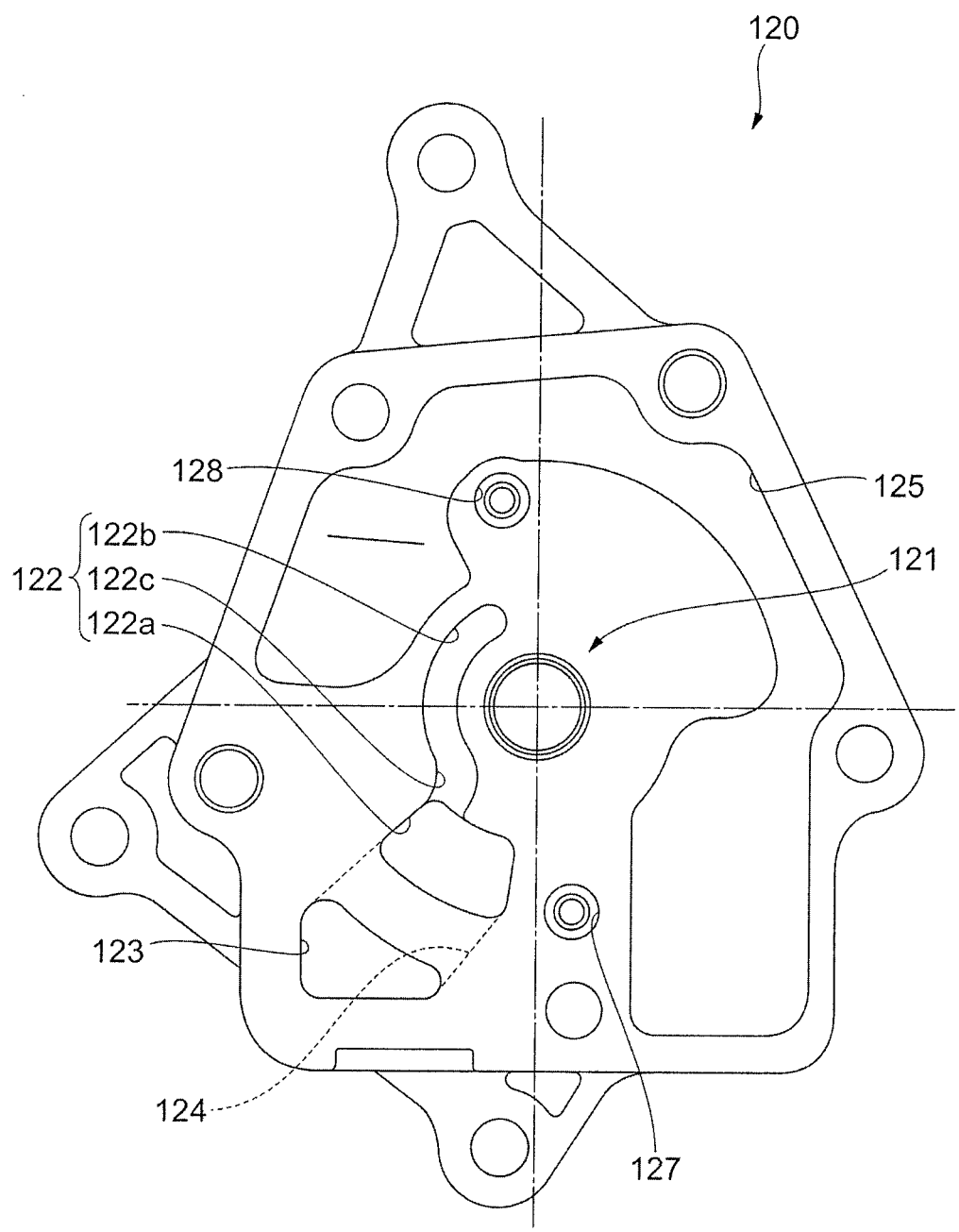
FIG. 11 is a view of a case cover viewed from the other side in the rotational axial direction.

FIG. 11 is a view of the case cover 120 viewed from the other side in the rotational axial direction.

The case cover 120 includes the case cover bearing 121 at a central portion, which rotatably supports the rotation shaft 10.

The case cover 120 includes a case cover low pressure side discharge-recess portion 122 that is positioned to face the low pressure side discharge through-hole 65 of the outer plate 60, and the outer-plate low pressure side through-hole 66, and that is recessed from a case 110 side end surface of the case cover 120 in the rotational axial direction. The case cover low pressure side discharge-recess portion 122 includes a first case cover low pressure side discharge-recess portion 122a that is formed to face the low pressure side discharge through-hole 65; a second case cover low pressure side discharge-recess portion 122b that is formed to face the outer-plate low pressure side through-hole 66; and a third case cover low pressure side discharge-recess portion 122c through which the first case cover low pressure side discharge-recess portion 122a is connected to the second case cover low pressure side discharge-recess portion 122b.

The case cover 120 includes the case cover outer recess portion 123 that is positioned outside of the case cover low pressure side discharge-recess portion 122 in the rotational radial direction, and that is recessed from the case 110 side end surface in the rotational axial direction. In addition, the case cover 120 includes a case cover recess portion connection portion 124 through which the case cover outer recess portion 123 is connected to the first case cover low pressure side discharge-recess portion 122a of the case cover low pressure side discharge-recess portion 122 further on the other side in the rotational axial direction than the case 110 side end surface. The case cover outer recess portion 123 is formed such that an opening of the case cover outer recess portion 123 is positioned not to face the aforementioned accommodation space formed in the case 110, but to face the case outer recess portion 115. The case cover low pressure side discharge-recess portion 122, the case cover recess portion connection portion 124, and the case cover outer recess portion 123 form a case cover low pressure side discharge passage R4 (refer to FIG. 5) of oil that is discharged from the low pressure side discharge port 5. The oil discharged from the low pressure side discharge port 5 flows into the case low pressure side discharge-passage R3 via the case cover recess portion connection portion 124, and flows into the outer-plate low pressure side through-hole 66 via the second case cover low pressure side discharge-recess portion 122b and the third case cover low pressure side discharge-recess portion 122c.

The second case cover low pressure side discharge-recess portion 122b and the third case cover low pressure side discharge-recess portion 122c are formed to have a depth and a width smaller than those of the first case cover low pressure side discharge-recess portion 122a. The amount of the oil flowing into the outer-plate low pressure side through-hole 66 is smaller than the amount of the oil flowing into the case low pressure side discharge-passage R3.

A case cover suction-recess portion 125 is formed at a portion of the case cover 120 which faces the high pressure side suction cut-out 611 and the low pressure side suction cut-out 612 of the outer plate 60, and at a portion of the case cover 120 which faces the space S1 further on the opening side of the inner plate fitting portion 112 of the case 110, and a space outside of the outer circumferential cam ring surface 41 of the cam ring 40 in the rotational radial direction. The case cover suction-recess portion 125 is recessed from the case 110 side end surface in the rotational axial direction.

The case cover suction-recess portion 125 forms the suction passage R1 of oil that is suctioned from the suction port 116, and then is suctioned into the pump chamber from the high pressure side suction port 2 and the low pressure side suction port 3.

The case cover 120 includes a first case cover recess portion 127 and a second case cover recess portion 128 which are respectively positioned to face the first through-hole 67 and the second through-hole 68 of the outer plate 60, and which are recessed from the case 110 side end surface in the rotational axial direction.

Method of Assembling Vane Pump 1

The vane pump 1 in the embodiment is assembled in the following manner.

The inner plate 50 is fitted into the inner plate fitting portion 112 of the case 110. The case 110 and the case cover 120 are connected to each other with multiple (five in the embodiment) bolts such that the inner-plate cam ring side end surface 53 of the inner plate 50 comes into contact with the inner end surface 43 of the cam ring 40, and the outer end surface 44 of the cam ring 40 comes into contact with the outer-plate cam ring side end surface 63 of the outer plate 60.

The first part 536 of the inner plate 50 holds one end portion of a cylindrical or columnar positioning pin passing through the first through-hole 47 formed in the cam ring 40 and the first through-hole 67 formed in the outer plate 60. The first case cover recess portion 127 of the case cover 120 holds the other end portion of the positioning pin. In addition, the second part 537 of the inner plate 50 holds one end portion of a cylindrical or columnar positioning pin passing through the second through-hole 48 formed in the cam ring 40 and the second through-hole 68 formed in the outer plate 60. The second case cover recess portion 128 of the case cover 120 holds the other end portion of the positioning pin. Accordingly, a relative position among the inner plate 50, the cam ring 40, the outer plate 60, and the case cover 120 is determined.

The rotor 20 and the vanes 30 are accommodated inside the cam ring 40. The one end portion of the rotation shaft 10 is rotatably supported by the case bearing 111 of the case 110. A portion of the rotation shaft 10 between the one end portion and the other end portion is rotatably supported by the case cover bearing 121 of the case cover 120 with the other end portion exposed from the housing 100.

Operation of Vane Pump 1

The vane pump 1 in the embodiment includes ten vanes 30 and ten pump chambers, each of which is formed by two adjacent vanes 30, an outer circumferential surface of the rotor 20 between the two adjacent vanes 30, the inner circumferential cam ring surface 42 between the two adjacent vanes 30, the inner-plate cam ring side end surface 53 of the inner plate 50, and the outer-plate cam ring side end surface 63 of the outer plate 60 when the ten vanes 30 come into contact with the inner circumferential cam ring surface 42 of the cam ring 40. In a case where attention is paid to only one pump chamber, when the rotation shaft 10 rotates one revolution, and the rotor 20 rotates one revolution, the pump chamber rotates one revolution around the rotation shaft 10. During one revolution of the pump chamber, oil suctioned from the high pressure side suction port 2 is compressed such that the pressure of the oil is increased, and then the oil is discharged from the high pressure side discharge port 4. Oil suctioned from the low pressure side suction port 3 is compressed such that the pressure of the oil is increased, and then the oil is discharged from the low pressure side discharge port 5. As illustrated in FIG. 7, the shape of the inner circumferential cam ring surface 42 of the cam ring 40 is formed such that the distance from the rotation center C to the first protrusion 42a of the inner circumferential cam ring surface 42 at each rotational angular position is longer than that from the rotation center C to the second protrusion 42b. As a result, the vane pump 1 in the embodiment discharges an amount of low pressure oil from the low pressure side discharge port 5, which is larger than the amount of oil discharged from the high pressure side discharge port 4. Since the base of the second protrusion 42b is smoother than that of the first protrusion 42a, the discharge pressure of oil discharged from the high pressure side discharge port 4 is higher than that of oil discharged from the low pressure side discharge port 5.

Figure 12:
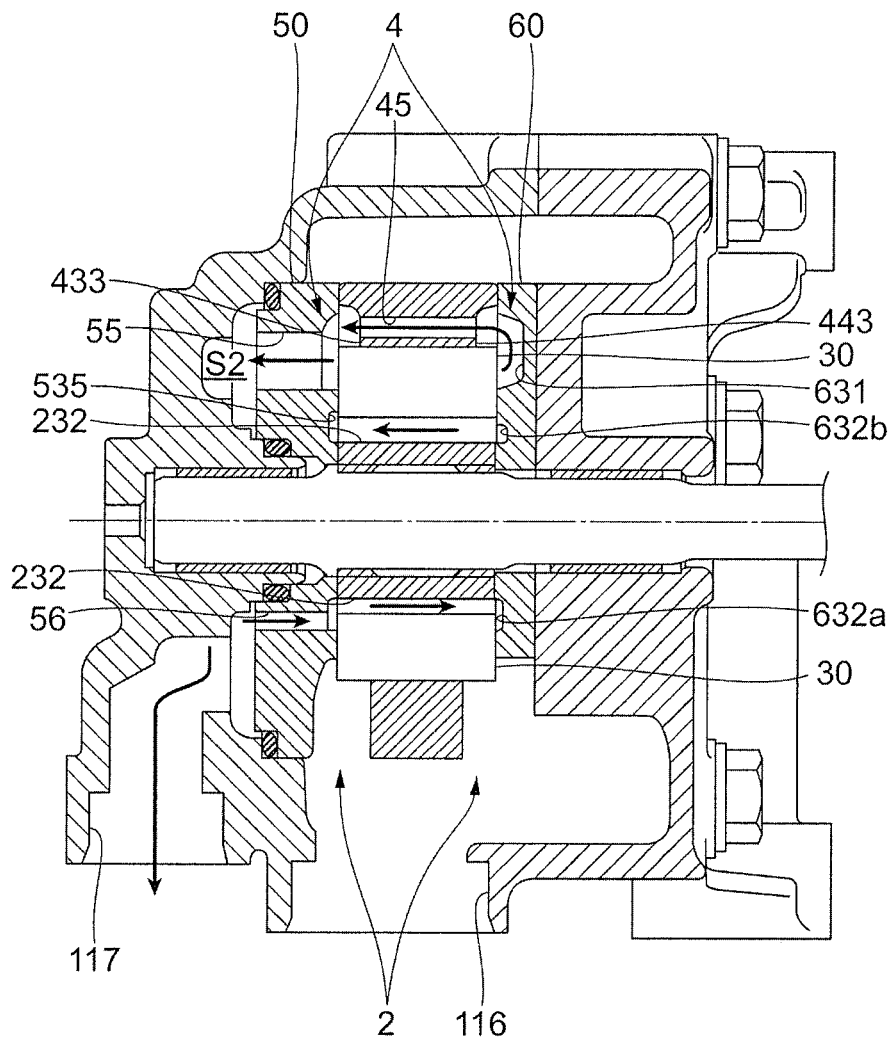
FIG. 12 is a view illustrating the flow of high pressure oil.

FIG. 12 is a view illustrating the flow of high pressure oil.

Oil (hereinafter, referred to as "high pressure oil"), which is discharged from the high pressure side discharge port 4, flows into the space S2 (further on the bottom portion side of the inner plate fitting portion 112) via the high pressure side discharge through-hole 55 of the inner plate 50, and then is discharged from the high pressure side discharge port 117. A portion of the high pressure oil, which has flown into the space S2 (further on the bottom portion side of the inner plate fitting portion 112) via the high pressure side discharge through-hole 55 of the inner plate 50, flows into the columnar grooves 232 of the vane grooves 23 of the rotor 20, which face the space S2, via the inner-plate high pressure side through-hole 56. A portion of the high pressure oil, which has flown into the columnar grooves 232 of the vane grooves 23, flows into the high pressure side upstream recess portion 632a of the outer plate 60. A portion of the high pressure oil, which has flown into the high pressure side upstream recess portion 632a of the outer plate 60, flows into the high pressure side downstream recess portion 632b via the high pressure side connection recess portion 632c (refer to FIG. 9A). A portion of the high pressure oil, which has flown into the high pressure side downstream recess portion 632b of the outer plate 60, flows into the columnar grooves 232 of the vane grooves 23 of the rotor 20 which face the high pressure side downstream recess portion 632b, and then flows into the inner-plate high pressure side recess portion 535 of the inner plate 50. Since the high pressure side upstream recess portion 632a, the high pressure side connection recess portion 632c, and the high pressure side downstream recess portion 632b are provided to correspond to a range from the high pressure side suction port 2 to the high pressure side discharge port 4, high pressure oil flows into the columnar grooves 232 of the vane grooves 23 corresponding to a high pressure side pump chamber. As a result, since the high pressure oil flows into the columnar grooves 232 of the vane grooves 23, even if force toward the rotation center is applied to the vanes 30 by increased pressure oil in the high pressure side pump chamber, the tips of the vanes 30 easily come into contact with the inner circumferential cam ring surface 42.

Figure 13:
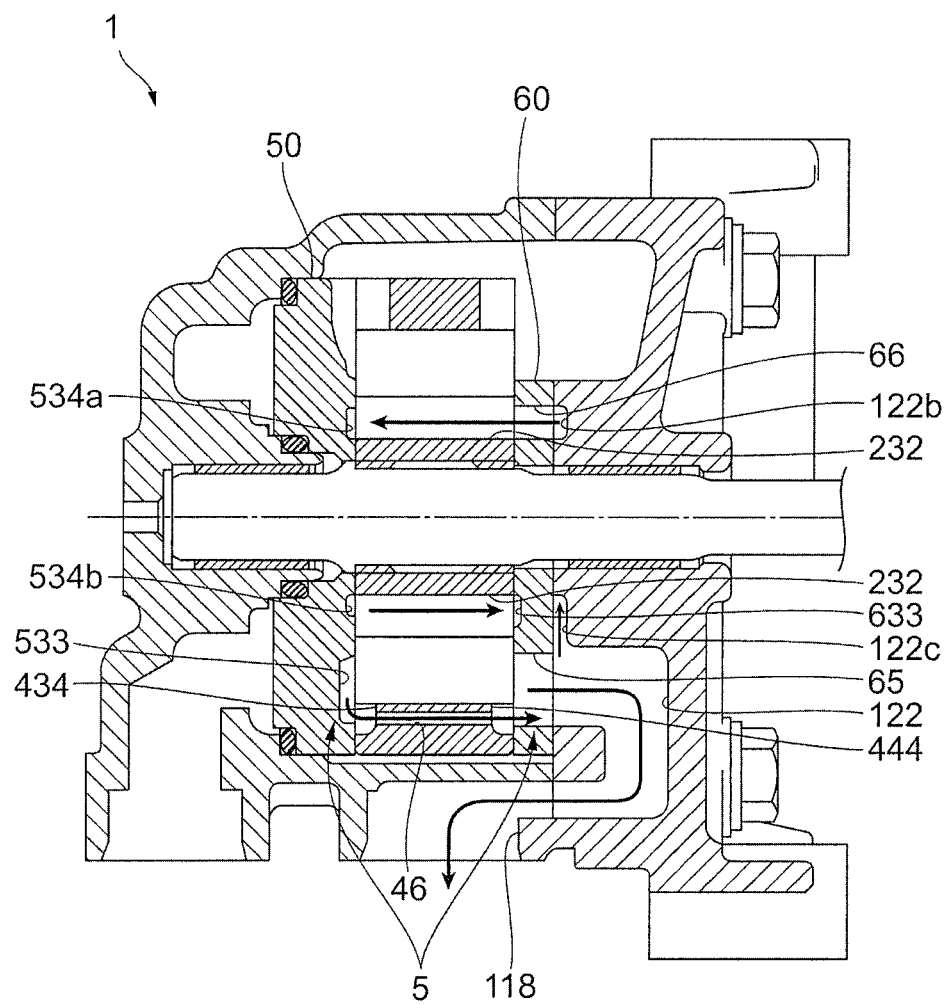
FIG. 13 is a view illustrating the flow of low pressure oil.

FIG. 13 is a view illustrating the flow of low pressure oil.

In contrast, oil (hereinafter, referred to as "low pressure oil"), which is discharged from the low pressure side discharge port 5, flows into the case cover low pressure side discharge-recess portion 122 via the low pressure side discharge through-hole 65 of the outer plate 60, and then is discharged from the low pressure side discharge port 118. A portion of the low pressure oil, which has flown into the third case cover low pressure side discharge-recess portion 122c of the case cover low pressure side discharge-recess portion 122 via the low pressure side discharge through-hole 65 of the outer plate 60, flows into the columnar grooves 232 of the vane grooves 23 of the rotor 20, which face the third case cover low pressure side discharge-recess portion 122c, via the second case cover low pressure side discharge-recess portion 122b and the outer-plate low pressure side through-hole 66. A portion of the low pressure oil, which has flown into the columnar grooves 232 of the vane grooves 23, flows into the low pressure side upstream recess portion 534a of the inner plate 50. A portion of the low pressure oil, which has flown into the low pressure side upstream recess portion 534a of the inner plate 50, flows into the low pressure side downstream recess portion 534b via the low pressure side connection recess portion 534c (refer to FIG. 8A). A portion of the low pressure oil, which has flown into the low pressure side downstream recess portion 534b of the inner plate 50, flows into the columnar grooves 232 of the vane grooves 23 of the rotor 20 which face the low pressure side downstream recess portion 534b, and then flows into the outer-plate low pressure side recess portion 633 of the outer plate 60. Since the low pressure side upstream recess portion 534a, the low pressure side connection recess portion 534c, and the low pressure side downstream recess portion 534b are provided to correspond to a range from the low pressure side suction port 3 to the low pressure side discharge port 5, low pressure oil flows into the columnar grooves 232 of the vane grooves 23 corresponding to a low pressure side pump chamber. As a result, since the low pressure oil flows into the columnar grooves 232 of the vane grooves 23 corresponding to the vanes 30 of the low pressure side pump chamber, contact pressure between the tips of the vanes 30 and the inner circumferential cam ring surface 42 is low compared to a case in which high pressure oil flows into the columnar grooves 232.

Regarding Oil Passage Formed in Inner Plate 50, and Facing Vane Groove 23 of Rotor 20

Hereinafter, a relationship between the inner-plate high pressure side recess portion 535 (that is, a high pressure oil passage) and the inner-plate low pressure side recess portion 534 (that is, a low pressure oil passage), which are formed in the inner plate 50, will be described. In addition, a relationship between the inner-plate high pressure side through-hole 56 (that is, a high pressure oil passage) and the inner-plate low pressure side recess portion 534 (that is, a low pressure oil passage), which are formed in the inner plate 50, will be described.

Figure 14A:
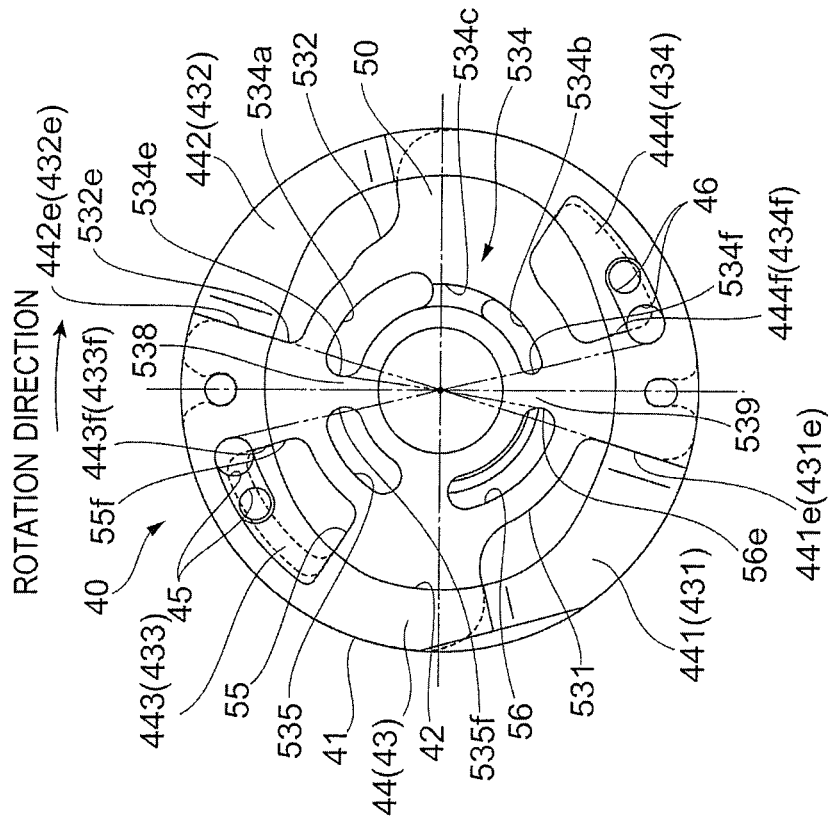
FIGS. 14A and 14B are views illustrating a relationship between an inner-plate high pressure side recess portion and an inner-plate low pressure side recess portion, and a relationship between an inner-plate high pressure side through-hole and the inner-plate low pressure side recess portion.
Figure 14B:
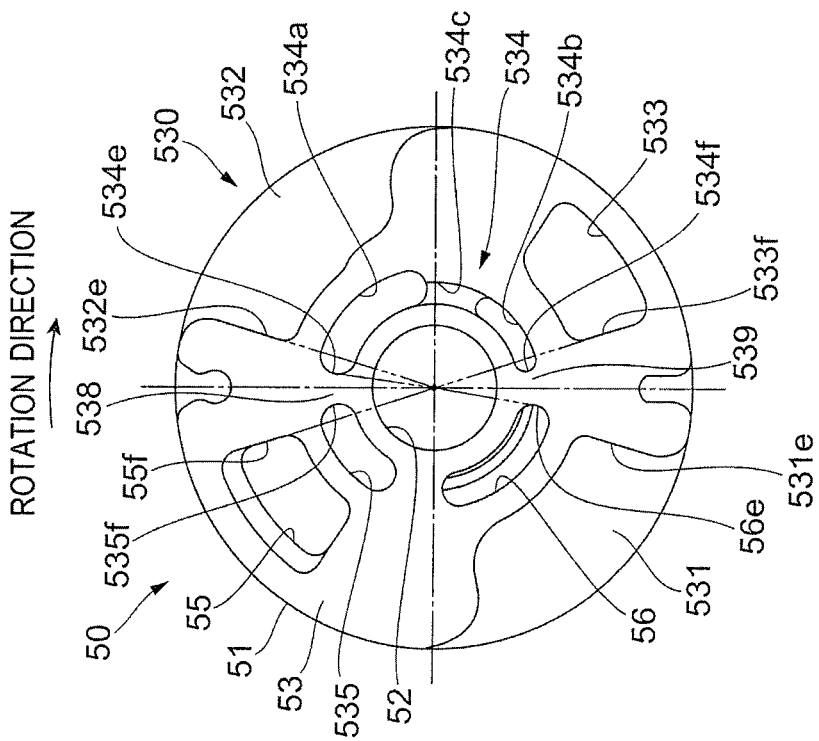

FIGS. 14A and 14B are views illustrating the relationship between the inner-plate high pressure side recess portion 535 and the inner-plate low pressure side recess portion 534, and the relationship between the inner-plate high pressure side through-hole 56 and the inner-plate low pressure side recess portion 534. FIG. 14A is a view of the inner plate 50 viewed from the one side in the rotational axial direction.

FIG. 14B is a view of the cam ring 40 and the inner plate 50 viewed from the one side in the rotational axial direction.

Regarding Relationship Between Inner-Plate High Pressure Side Recess Portion 535 and Inner-Plate Low Pressure Side Recess Portion 534

High pressure oil is supplied from the inner-plate high pressure side recess portion 535 to the columnar grooves 232 of the vane grooves 23 which support the vanes 30 forming a high pressure side pump chamber discharging high pressure oil. In contrast, low pressure oil is supplied from the inner-plate low pressure side recess portion 534 to the columnar grooves 232 of the vane grooves 23 which support the vanes 30 forming a low pressure side pump chamber discharging low pressure oil. In the vane pump 1 of the embodiment, this oil supply is realized by configurations described below in (1) and (2). (1) The inner-plate high pressure side recess portion 535 and the inner-plate low pressure side recess portion 534 are separated from each other between the high pressure side discharge port 4 and the low pressure side suction port 3 in the rotation direction (circumferential direction). (2) The size of a separation portion between the inner-plate high pressure side recess portion 535 and the inner-plate low pressure side recess portion 534 in the rotation direction (circumferential direction) is set such that the inner-plate high pressure side recess portion 535 does not communicate with the inner-plate low pressure side recess portion 534 via the vane groove 23 positioned between the inner-plate high pressure side recess portion 535 and the inner-plate low pressure side recess portion 534.

That is, as illustrated in FIG. 14A, in the configuration described in (1), an inner-plate high pressure side recess portion downstream end 535f, which is a downstream end portion (hereinafter, referred to as a "downstream end") of the inner-plate high pressure side recess portion 535 in the rotation direction, is not continuous with an inner-plate low pressure side recess portion upstream end 534e which is an upstream end portion (hereinafter, referred to as an "upstream end") of the inner-plate low pressure side recess portion 534 in the rotation direction. An inner-plate low pressure side suction upstream separator 538 is positioned between the inner-plate high pressure side recess portion downstream end 535f and the inner-plate low pressure side recess portion upstream end 534e in the rotation direction. The inner-plate low pressure side suction upstream separator 538 between the inner-plate high pressure side recess portion 535 and the inner-plate low pressure side recess portion 534 is positioned in the rotation direction between a high pressure side discharge through-hole downstream end 55f, which is a downstream end of the high pressure side discharge through-hole 55 of the inner plate 50 which forms the high pressure side discharge port 4, and a low pressure side suction-recess portion upstream end 532e which is an upstream end of the low pressure side suction recess portion (a portion facing a pump chamber) 532 which forms the low pressure side suction port 3. As illustrated in FIG. 14B, the inner-plate low pressure side suction upstream separator 538 between the inner-plate high pressure side recess portion 535 and the inner-plate low pressure side recess portion 534 is positioned in the rotation direction between a high pressure side discharge-recess portion downstream end 433f (443f), which is a downstream end of the high pressure side discharge recess portion 433 (443) of the cam ring 40 which forms the high pressure side discharge port 4, and a low pressure side suction-recess portion upstream end 432e (442e) which is an upstream end of the low pressure side suction recess portion 432 (442) forming the low pressure side suction port 3.

FIG. 15 is a view illustrating the size of the inner-plate low pressure side suction upstream separator 538 in the rotation direction.

In the configuration described in (2), for example, as illustrated in FIG. 15, a size 538W of the inner-plate low pressure side suction upstream separator 538 in the rotation direction is larger than a size 232W of the columnar groove 232 of the vane groove 23 in the rotation direction. In other words, for example, the size 538W of the inner-plate low pressure side suction upstream separator 538 in the rotation direction is set such that the inner-plate high pressure side recess portion 535 and the inner-plate low pressure side recess portion 534 do not extend to the columnar groove 232 of the vane groove 23. For example, in a case where the size 538W of the inner-plate low pressure side suction upstream separator 538 in the rotation direction is smaller than the size 232W of the columnar groove 232 of the vane groove 23 in the rotation direction, and the size 538W is set such that the inner-plate high pressure side recess portion 535 and the inner-plate low pressure side recess portion 534 extend to the columnar groove 232 of the vane groove 23, the inner-plate high pressure side recess portion 535 communicates with the inner-plate low pressure side recess portion 534 via the vane groove 23. In a case where the inner-plate high pressure side recess portion 535 communicates with the inner-plate low pressure side recess portion 534 via the vane groove 23, high pressure oil in the inner-plate high pressure side recess portion 535 flows into the inner-plate low pressure side recess portion 534 via the vane groove 23, and high pressure oil flows into the columnar groove 232 of the vane groove 23 which supports the vane 30 forming a low pressure side pump chamber. In a case where high pressure oil flows into the columnar groove 232 of the vane groove 23 which supports the vane 30 forming a low pressure side pump chamber, the pressure of oil in the vane groove 23, in which a rear end (end portion close to the rotation center) of the vane 30 is positioned, becomes higher than that of the oil of the low pressure side pump chamber in which the tip of the vane 30 is positioned. Accordingly, contact pressure between the tip of the vane 30 of the low pressure side pump chamber and the inner circumferential cam ring surface 42 is increased compared to a case in which low pressure oil flows into the columnar groove 232. As a result, torque loss may occur, or oil may leak from the columnar groove 232 to the low pressure side pump chamber on a tip side of the vane 30. In the configuration of the embodiment, since the inner-plate high pressure side recess portion 535 does not communicate with the inner-plate low pressure side recess portion 534 via the vane groove 23, the occurrence of torque loss or oil leakage is prevented. In addition, due to high pressure oil in the inner-plate high pressure side recess portion 535 flowing into the inner-plate low pressure side recess portion 534 via the vane groove 23, the pressure of oil in the columnar groove 232 of the vane groove 23, in which the rear end (end portion close to the rotation center) of the vane 30 is positioned, becomes lower than that of oil in the high pressure side pump chamber in which the tip of the vane 30 is positioned, which is a problem. In a case where the pressure of oil in the columnar groove 232 of the vane groove 23, in which the rear end of the vane 30 is positioned, becomes lower than that of oil in the pump chamber in which the tip of the vane 30 is positioned, oil may leak from the pump chamber to the columnar groove 232. In the configuration of the embodiment, since the inner-plate high pressure side recess portion 535 does not communicate with the inner-plate low pressure side recess portion 534 via the vane groove 23, leaking of oil from the high pressure side pump chamber into the columnar groove 232 is prevented.

Regarding Relationship Between Inner-Plate High Pressure Side Through-Hole 56 and Inner-Plate Low Pressure Side Recess Portion 534

High pressure oil is supplied from the inner-plate high pressure side through-hole 56 to the columnar grooves 232 of the vane grooves 23 which support the vanes 30 forming a high pressure side pump chamber discharging high pressure oil. In contrast, low pressure oil is supplied from the inner-plate low pressure side recess portion 534 to the columnar grooves 232 of the vane grooves 23 which support the vanes 30 forming a low pressure side pump chamber discharging low pressure oil. In the vane pump 1 of the embodiment, this oil supply is realized by configurations described below in (3) and (4). (3) The inner-plate high pressure side through-hole 56 and the inner-plate low pressure side recess portion 534 are separated from each other between the low pressure side discharge port 5 and the high pressure side suction port 2 in the rotation direction. (4) The size of a separation portion between the inner-plate high pressure side through-hole 56 and the inner-plate low pressure side recess portion 534 in the rotation direction is set such that the inner-plate high pressure side through-hole 56 does not communicate with the inner-plate low pressure side recess portion 534 via the vane grooves 23 positioned between the inner-plate high pressure side through-hole 56 and the inner-plate low pressure side recess portion 534.

That is, as illustrated in FIG. 14A, in the configuration described in (3), an inner-plate low pressure side recess portion downstream end 534f, which is a downstream end of the inner-plate low pressure side recess portion 534, is not continuous with an inner-plate high pressure side through-hole upstream end 56e which is an upstream end of the inner-plate high pressure side through-hole 56. An inner-plate high pressure side suction upstream separator 539 is positioned between inner-plate low pressure side recess portion downstream end 534f and the inner-plate high pressure side through-hole upstream end 56e in the rotation direction. The inner-plate high pressure side suction upstream separator 539 between the inner-plate low pressure side recess portion 534 and the inner-plate high pressure side through-hole 56 is positioned in the rotation direction between a low pressure side discharge-recess portion downstream end 533f, which is a downstream end of the low pressure side discharge recess portion 533 of the inner plate 50 which forms the low pressure side discharge port 5, and a high pressure side suction-recess portion upstream end 531e which is an upstream end of the high pressure side suction recess portion 531 (a portion facing a pump chamber) which forms the high pressure side suction port 2. As illustrated in FIG. 14B, the inner-plate high pressure side suction upstream separator 539 between the inner-plate low pressure side recess portion 534 and the inner-plate high pressure side through-hole 56 is positioned in the rotation direction between a low pressure side discharge-recess portion downstream end 434f (444f), which is a downstream end of the low pressure side discharge recess portion 434 (444) of the cam ring 40 which forms the low pressure side discharge port 5, and a high pressure side suction-recess portion upstream end 431e (441e) which is an upstream end of the high pressure side suction recess portion 431 (441) forming the high pressure side suction port 2.

In the configuration described in (4), for example, the size of the inner-plate high pressure side suction upstream separator 539 in the rotation direction is larger than the size 232W of the columnar groove 232 of the vane groove 23 in the rotation direction. In other words, the size of the inner-plate high pressure side suction upstream separator 539 in the rotation direction is set such that the inner-plate low pressure side recess portion 534 and the inner-plate high pressure side through-hole 56 do not extend to the columnar groove 232 of the vane groove 23. In this configuration, it is possible to prevent flowing of high pressure oil into the inner-plate low pressure side recess portion 534 via the vane groove 23, and flowing of high pressure oil into the columnar grooves 232 of the vane grooves 23 which support the vanes 30 forming the low pressure side pump chamber, which is caused by communication between the inner-plate low pressure side recess portion 534 and the inner-plate high pressure side through-hole 56 via the vane groove 23. Accordingly, contact pressure between the tip of the vane 30 of the low pressure side pump chamber and the inner circumferential cam ring surface 42 is decreased compared to a case in which high pressure oil flows into the columnar groove 232. As a result, the occurrence of torque loss is prevented. Leaking of oil from the columnar groove 232 into the low pressure side pump chamber on a tip side of the vane 30 is prevented. In addition, it is possible to prevent leaking of oil from the high pressure side pump chamber into the columnar groove 232 via the vane groove 23, which is caused by flowing of high pressure oil in the inner-plate high pressure side through-hole 56 into the inner-plate low pressure side recess portion 534 via the vane groove 23.

Regarding Oil Passage Formed in Outer Plate 60, and Facing Vane Groove 23 of Rotor 20

Hereinafter, a relationship between the outer-plate high pressure side recess portion 632 (that is, a high pressure oil passage) and the outer-plate low pressure side through-hole 66 (that is, a low pressure oil passage), which are formed in the outer plate 60, will be described. In addition, a relationship between the outer-plate high pressure side recess portion 632 (that is, a high pressure oil passage) and the outer-plate low pressure side recess portion 633 (that is, a low pressure oil passage), which are formed in the outer plate 60, will be described.

FIGS. 16A and 16B are views illustrating the relationship between the outer-plate high pressure side recess portion 632 and the outer-plate low pressure side through-hole 66, and the relationship between the outer-plate low pressure side recess portion 633 and the outer-plate high pressure side recess portion 632. FIG. 16A is a view of the outer plate 60 viewed from the other side in the rotational axial direction. FIG. 16B is a view of the cam ring 40 and the outer plate 60 viewed from the other side in the rotational axial direction.

Regarding Relationship Between Outer-Plate High Pressure Side Recess Portion 632 and Outer-Plate Low Pressure Side Through-Hole 66

High pressure oil is supplied from the outer-plate high pressure side recess portion 632 to the columnar grooves 232 of the vane grooves 23 which support the vanes 30 forming a high pressure side pump chamber discharging high pressure oil. In contrast, low pressure oil is supplied from the outer-plate low pressure side through-hole 66 to the columnar grooves 232 of the vane grooves 23 which support the vanes 30 forming a low pressure side pump chamber discharging low pressure oil. In the vane pump 1 of the embodiment, this oil supply is realized by configurations described below in (5) and (6). (5) The outer-plate high pressure side recess portion 632 and the outer-plate low pressure side through-hole 66 are separated from each other between the high pressure side discharge port 4 and the low pressure side suction port 3 in the rotation direction. (6) The size of a separation portion between the outer-plate high pressure side recess portion 632 and the outer-plate low pressure side through-hole 66 in the rotation direction is set such that the outer-plate high pressure side recess portion 632 does not communicate with the outer-plate low pressure side through-hole 66 via the vane groove 23 positioned between the outer-plate high pressure side recess portion 632 and the outer-plate low pressure side through-hole 66.

That is, as illustrated in FIG. 16A, in the configuration described in (5), an outer-plate high pressure side recess portion downstream end 632$f$, which is a downstream end of the outer-plate high pressure side recess portion 632, is not continuous with an outer-plate low pressure side through-hole upstream end 66$e$ which is an upstream end of the outer-plate low pressure side through-hole 66. An outer-plate low pressure side suction upstream separator 638 is positioned between the outer-plate high pressure side recess portion downstream end 632$f$ and the outer-plate low pressure side through-hole upstream end 66$e$ in the rotation direction. The outer-plate low pressure side suction upstream separator 638 between the outer-plate high pressure side recess portion 632 and the outer-plate low pressure side through-hole 66 is positioned in the rotation direction between a high pressure side discharge-recess portion downstream end 631$f$, which is a downstream end of the high pressure side discharge recess portion 631 of the outer plate 60 which forms the high pressure side discharge port 4, and a low pressure side suction cut-out upstream end 612$e$ which is an upstream end of the low pressure side suction cut-out (a portion facing a pump chamber) 612 which forms the low pressure side suction port 3. As illustrated in FIG. 16B, the outer-plate low pressure side suction upstream separator 638 between the outer-plate high pressure side recess portion 632 and the outer-plate low pressure side through-hole 66 is positioned in the rotation direction between the high pressure side discharge-recess portion downstream end 443$f$ (433$f$), which is a downstream end of the high pressure side discharge recess portion 443 (433) of the cam ring 40 which forms the high pressure side discharge port 4, and the low pressure side suction-recess portion upstream end 442$e$ (432$e$) which is an upstream end of the low pressure side suction recess portion 442 (432) which forms the low pressure side suction port 3.

In the configuration described in (6), for example, the size of the outer-plate low pressure side suction upstream separator 638 in the rotation direction is larger than the size 232W of the columnar groove 232 of the vane groove 23 in the rotation direction. In other words, for example, the size of the outer-plate low pressure side suction upstream separator 638 in the rotation direction is set such that the outer-plate high pressure side recess portion 632 and the outer-plate low pressure side through-hole 66 do not extend to the columnar groove 232 of the vane groove 23. In this configuration, it is possible to prevent flowing of high pressure oil into the outer-plate low pressure side through-hole 66 via the vane groove 23, and flowing of high pressure oil into the columnar grooves 232 of the vane grooves 23 which support the vanes 30 forming the low pressure side pump chamber, which is caused by communication between the outer-plate high pressure side recess portion 632 and the outer-plate low pressure side through-hole 66 via the vane groove 23. Accordingly, contact pressure between the tip of the vane 30 of the low pressure side pump chamber and the inner circumferential cam ring surface 42 is decreased compared to a case in which high pressure oil flows into the columnar groove 232. As a result, the occurrence of torque loss is prevented. In addition, leaking of oil from the columnar groove 232 into the low pressure side pump chamber on a tip side of the vane 30 is prevented. In addition, it is possible to prevent leaking of oil from the high pressure side pump chamber into the columnar groove 232 via the vane groove 23, which is caused by flowing of high pressure oil in the outer-plate high pressure side recess portion 632 into the outer-plate low pressure side through-hole 66 via the vane groove 23.

Regarding Relationship Between Outer-Plate High Pressure Side Recess Portion 632 and Outer-Plate Low Pressure Side Recess Portion 633

High pressure oil is supplied from the outer-plate high pressure side recess portion 632 to the columnar grooves 232 of the vane grooves 23 which support the vanes 30 forming a high pressure side pump chamber discharging high pressure oil. In contrast, low pressure oil is supplied from the outer-plate low pressure side recess portion 633 to the columnar grooves 232 of the vane grooves 23 which support the vanes 30 forming a low pressure side pump chamber discharging low pressure oil. In the vane pump 1 of the embodiment, this oil supply is realized by configurations described below in (7) and (8). (7) The outer-plate high pressure side recess portion 632 and the outer-plate low pressure side recess portion 633 are separated from each other between the low pressure side discharge port 5 and the high pressure side suction port 2 in the rotation direction. (8) The size of a separation portion between the outer-plate high pressure side recess portion 632 and the outer-plate low pressure side recess portion 633 in the rotation direction is set such that the outer-plate high pressure side recess portion 632 does not communicate with the outer-plate low pressure side recess portion 633 via the vane groove 23 positioned between the outer-plate high pressure side recess portion 632 and the outer-plate low pressure side recess portion 633.

That is, as illustrated in FIG. 16A, in the configuration described in (7), an outer-plate low pressure side recess portion downstream end 633$f$, which is a downstream end of the outer-plate low pressure side recess portion 633, is not continuous with an outer-plate high pressure side recess portion upstream end 632$e$ which is an upstream end of the outer-plate high pressure side recess portion 632. An outer-plate high pressure side suction upstream separator 639 is positioned between the outer-plate low pressure side recess portion downstream end 633$f$ and the outer-plate high pressure side recess portion upstream end 632$e$ in the rotation direction. The outer-plate high pressure side suction upstream separator 639 between the outer-plate low pressure side recess portion 633 and the outer-plate high pressure side recess portion 632 is positioned in the rotation direction between a low pressure side discharge through-hole downstream end 65$f$, which is a downstream end of the low pressure side discharge through-hole 65 of the outer plate 60 which forms the low pressure side discharge port 5, and a high pressure side suction cut-out upstream end 611$e$ which is an upstream end of the high pressure side suction cut-out (a portion facing a pump chamber) 611 which forms the high pressure side suction port 2. As illustrated in FIG. 16B, the outer-plate high pressure side suction upstream separator 639 between the outer-plate low pressure side recess portion 633 and the outer-plate high pressure side recess portion 632 is positioned in the rotation direction between the low pressure side discharge-recess portion downstream end 444$f$ (434$f$), which is a downstream end of the low pressure side discharge recess portion 444 (434) of the cam ring 40 which forms the low pressure side discharge port 5, and the high pressure side suction-recess portion upstream end 441$e$ (431e) which is an upstream end of the high pressure side suction recess portion 441 (431) forming the high pressure side suction port 2.

In the configuration described in (8), for example, the size of the outer-plate high pressure side suction upstream separator 639 in the rotation direction is larger than the size 232W of the columnar groove 232 of the vane groove 23 in the rotation direction. In other words, for example, the size of the outer-plate high pressure side suction upstream separator 639 in the rotation direction is set such that the outer-plate low pressure side recess portion 633 and the outer-plate high pressure side recess portion 632 do not extend to the columnar groove 232 of the vane groove 23. In this configuration, it is possible to prevent flowing of high pressure oil into the outer-plate low pressure side recess portion 633 via the vane groove 23, and flowing of high pressure oil into the columnar grooves 232 of the vane grooves 23 which support the vanes 30 forming the low pressure side pump chamber, which is caused by communication between the outer-plate low pressure side recess portion 633 and the outer-plate high pressure side recess portion 632 via the vane groove 23. Accordingly, contact pressure between the tip of the vane 30 of the low pressure side pump chamber and the inner circumferential cam ring surface 42 is decreased compared to a case in which high pressure oil flows into the columnar groove 232. As a result, the occurrence of torque loss is prevented. Leaking of oil from the columnar groove 232 into the low pressure side pump chamber on a tip side of the vane 30 is prevented. In addition, it is possible to prevent leaking of oil from the high pressure side pump chamber into the columnar groove 232 via the vane groove 23, which is caused by flowing of high pressure oil in the outer-plate high pressure side recess portion 632 into the outer-plate low pressure side recess portion 633 via the vane groove 23.

Figure 17A:
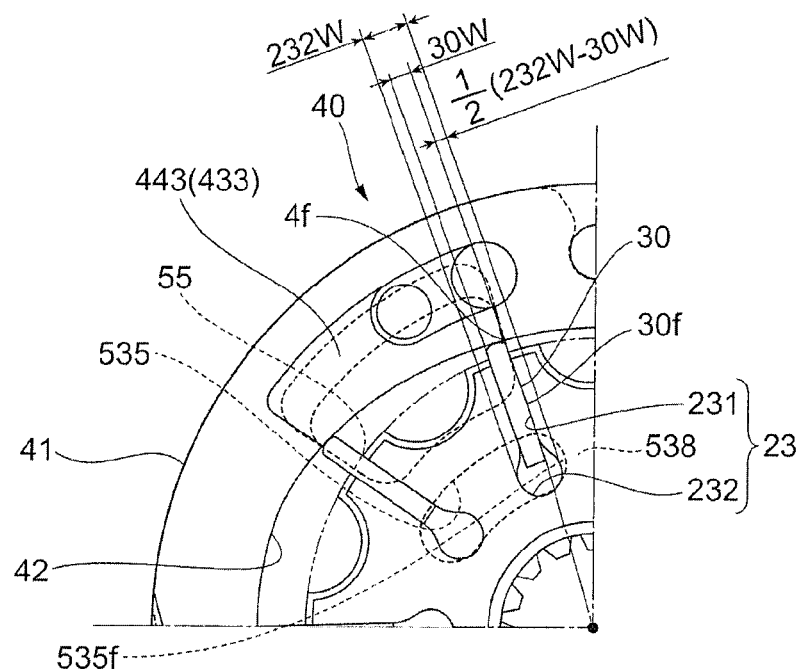
FIGS. 17A and 17B are views illustrating an upper limit value of the size of the inner-plate low pressure side suction upstream separator in the rotation direction.
Figure 17B:
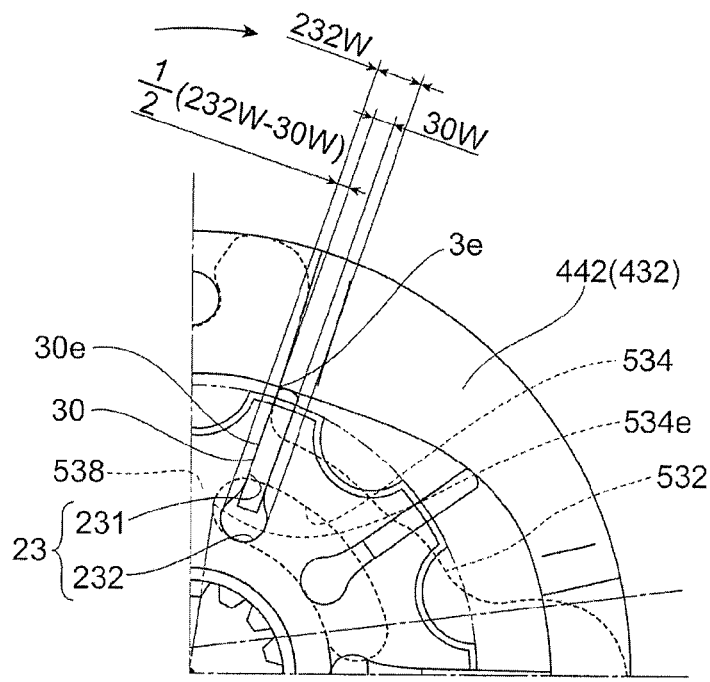

Upper Limit Value of Size of Each of Inner-Plate Low Pressure Side Suction Upstream Separator 538, Inner-Plate High Pressure Side Suction Upstream Separator 539, Outer-Plate Low Pressure Side Suction Upstream Separator 638, and Outer-Plate High Pressure Side Suction Upstream Separator 639 in Rotation Direction FIGS. 17A and 17B are views illustrating an upper limit value of the size of the inner-plate low pressure side suction upstream separator 538 in the rotation direction.

As illustrated in FIG. 17A, when a vane downstream end 30f, which is a downstream end of the vane 30, is positioned in the rotation direction at a high pressure side discharge-port downstream end 4f (most downstream point of an opening of the high pressure side discharge recess portion 433 (the high pressure side discharge recess portion 443) which is positioned to face the inner circumferential cam ring surface 42) which is a downstream end of the high pressure side discharge port 4, desirably, all of the columnar grooves 232 of the vane grooves 23 supporting the vane 30 communicate with the inner-plate high pressure side recess portion 535. That is, it is required that the inner-plate high pressure side recess portion downstream end 535f (that is, the downstream end of the inner-plate high pressure side recess portion 535) is positioned half ((232W−30W)/2) the distance (obtained by subtracting a size 30W of the vane 30 in the rotation direction from the size 232W of the columnar groove 232 of the vane groove 23 in the rotation direction) or greater downstream from the high pressure side discharge-port downstream end 4f which is the downstream end of the high pressure side discharge port 4. In this configuration, an outer end portion of the vane 30, which is positioned in a high pressure side pump chamber in the rotational radial direction, is pushed by high pressure oil introduced into the columnar groove 232 of the vane groove 23, and thus, the tip of the vane 30 easily comes into contact with the inner circumferential cam ring surface 42. In a case where the size 232W of the columnar groove 232 of the vane groove 23 in the rotation direction is substantially the same as the size 30W of the vane 30 in the rotation direction, the inner-plate high pressure side recess portion downstream end 535f, which is the downstream end of the inner-plate high pressure side recess portion 535, may be substantially positioned at the high pressure side discharge-port downstream end 4f which is the downstream end of the high pressure side discharge port 4.

As illustrated in FIG. 17B, when a vane upstream end 30e, which is an upstream end of the vane 30, is positioned in the rotation direction at a low pressure side suction-port upstream end 3e (most upstream point of an opening of the low pressure side suction recess portion 432 (the low pressure side suction recess portion 442) which is positioned to face the inner circumferential cam ring surface 42) which is an upstream end of the low pressure side suction port 3, desirably, all of the columnar grooves 232 of the vane grooves 23 supporting the vane 30 communicate with the inner-plate low pressure side recess portion 534. That is, it is required that the inner-plate low pressure side recess portion upstream end 534e (that is, the upstream end of the inner-plate low pressure side recess portion 534) is positioned half ((232W−30W)/2) the distance (obtained by subtracting the size 30W of the vane 30 in the rotation direction from the size 232W of the columnar groove 232 of the vane groove 23 in the rotation direction) or greater upstream from the low pressure side suction-port upstream end 3e which is the upstream end of the low pressure side suction port 3. In this configuration, an outer end portion of the vane 30, which is positioned in a low pressure side pump chamber in the rotational radial direction, is pushed by low pressure oil, and thus, the tip of the vane 30 easily comes into contact with the inner circumferential cam ring surface 42. In a case where the size 232W of the columnar groove 232 of the vane groove 23 in the rotation direction is substantially the same as the size 30W of the vane 30 in the rotation direction, the inner-plate low pressure side recess portion upstream end 534e, which is the upstream end of the inner-plate low pressure side recess portion 534, may be substantially positioned at the low pressure side suction-port upstream end 3e which is the upstream end of the low pressure side suction port 3.

Figure 18:
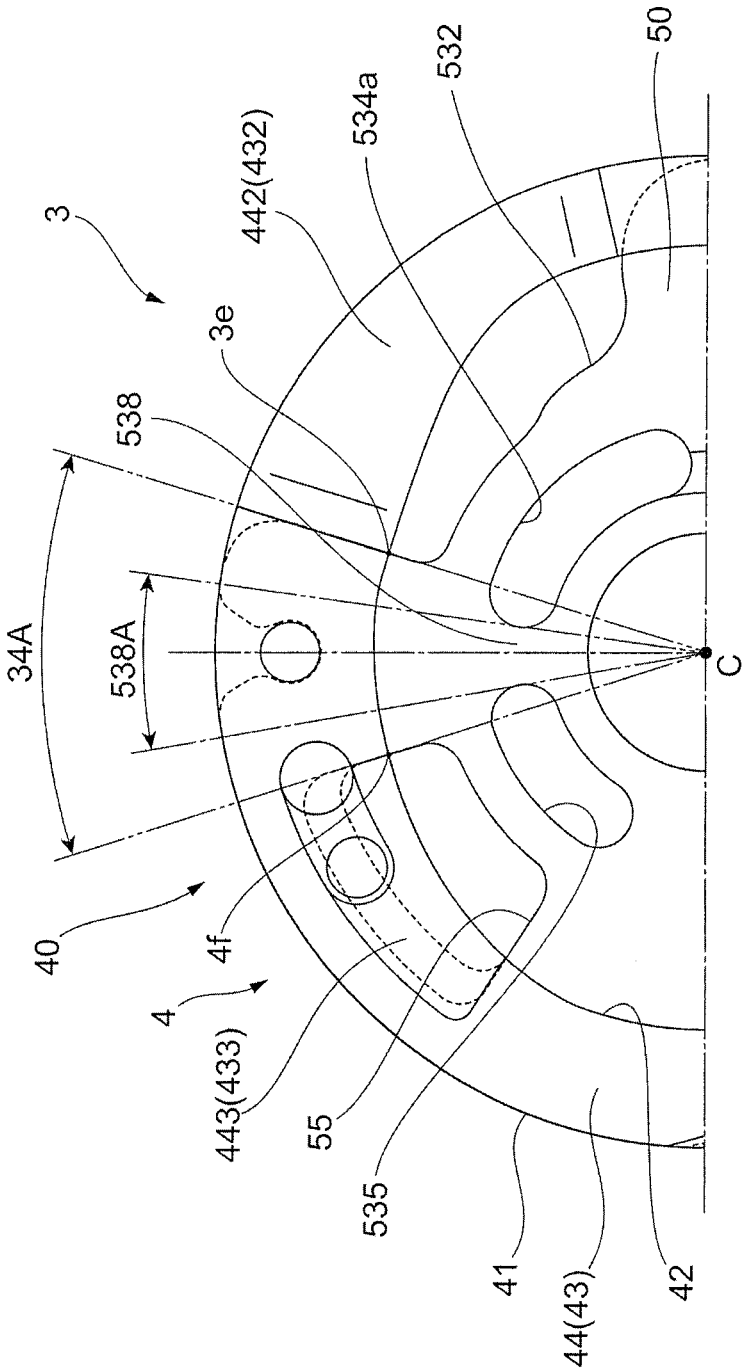
FIG. 18 is a view illustrating a relationship among the inner-plate low pressure side suction upstream separator, a high pressure side discharge port, and a low pressure side suction port.

FIG. 18 is a view illustrating a relationship among the inner-plate low pressure side suction upstream separator 538, the high pressure side discharge port 4, and the low pressure side suction port 3.

From the aforementioned description, when viewed in the rotational axial direction, desirably, a separation angle 538A of the inner-plate low pressure side suction upstream separator 538 in the rotation direction is smaller than or equal to a port-to-port angle 34A between the high pressure side discharge port 4 and the low pressure side suction port 3. In other words, desirably, the size 538W of the inner-plate low pressure side suction upstream separator 538 in the rotation direction is set to a value in the range of the port-to-port angle 34A between the high pressure side discharge port 4 and the low pressure side suction port 3 in the rotation direction. More specifically, desirably, the separation angle 538A of the inner-plate low pressure side suction upstream separator 538 is smaller than or equal to the port-to-port angle 34A between the high pressure side discharge-port downstream end 4f, which is the downstream end of the high pressure side discharge port 4, and the low pressure side suction-port upstream end 3e which is the upstream end of the low pressure side suction port 3. When viewed in the rotational axial direction, the port-to-port angle 34A between the high pressure side discharge-port downstream end 4f and the low pressure side suction-port upstream end 3e in the rotation direction is an acute angle that is formed by a line connecting the high pressure side discharge-port downstream end 4f and the rotation center C, and a line connecting the low pressure side suction-port upstream end 3e and the rotation center C.

For the same reason, when viewed in the rotational axial direction, desirably, the rotation angle of the outer-plate low pressure side suction upstream separator 638 is smaller than or equal to the angle between the high pressure side discharge-port downstream end 4f, which is the downstream end of the high pressure side discharge port 4, and the low pressure side suction-port upstream end 3e which is the upstream end of the low pressure side suction port 3.

When the vane downstream end 30f, which is the downstream end of the vane 30, is positioned at a low pressure side discharge-port downstream end (not illustrated) (most downstream point of an opening of the low pressure side discharge recess portion 434 (the low pressure side discharge recess portion 444) which is positioned to face the inner circumferential cam ring surface 42) which is a downstream end of the low pressure side discharge port 5, desirably, all of the columnar grooves 232 of the vane grooves 23 supporting the vanes 30 communicate with the inner-plate low pressure side recess portion 534. That is, it is required that the inner-plate low pressure side recess portion downstream end 534f (refer to FIGS. 14A and 14B) (that is, the downstream end of the inner-plate low pressure side recess portion 534) is positioned half ((232W−30W)/2) the distance (obtained by subtracting the size 30W of the vane 30 in the rotation direction from the size 232W of the columnar groove 232 of the vane groove 23 in the rotation direction) or greater downstream from the low pressure side discharge-port downstream end which is the downstream end of the low pressure side discharge port 5. In this configuration, an outer end portion of the vane 30, which is positioned in a low pressure side pump chamber in the rotational radial direction, is pushed by low pressure oil introduced into the columnar groove 232 of the vane groove 23, and thus, the tip of the vane 30 easily comes into contact with the inner circumferential cam ring surface 42. In a case where the size 232W of the columnar groove 232 of the vane groove 23 in the rotation direction is substantially the same as the size 30W of the vane 30 in the rotation direction, the inner-plate low pressure side recess portion downstream end 534f, which is the downstream end of the inner-plate low pressure side recess portion 534, may be substantially positioned at the low pressure side discharge-port downstream end which is the downstream end of the low pressure side discharge port 5.

When the vane upstream end 30e, which is the upstream end of the vane 30, is positioned at a high pressure side suction-port upstream end (not illustrated) (most upstream point of an opening of the high pressure side suction recess portion 431 (the high pressure side suction recess portion 441) which is positioned to face the inner circumferential cam ring surface 42) which is an upstream end of the high pressure side suction port 2, desirably, all of the columnar grooves 232 of the vane grooves 23 supporting the vane 30 communicate with the inner-plate high pressure side through-hole 56. That is, it is required that the inner-plate high pressure side through-hole upstream end 56e (refer to FIGS. 14A and 14B) (that is, the upstream end of the inner-plate high pressure side through-hole 56) is positioned half ((232W−30W)/2) the distance (obtained by subtracting the size 30W of the vane 30 in the rotation direction from the size 232W of the columnar groove 232 of the vane groove 23 in the rotation direction) or greater upstream from the high pressure side suction-port upstream end which is the upstream end of the high pressure side suction port 2. In this configuration, an outer end portion of the vane 30, which is positioned in a high pressure side pump chamber in the rotational radial direction, is pushed by high pressure oil, and thus, the tip of the vane 30 easily comes into contact with the inner circumferential cam ring surface 42. In a case where the size 232W of the columnar groove 232 of the vane groove 23 in the rotation direction is substantially the same as the size 30W of the vane 30 in the rotation direction, the inner-plate high pressure side through-hole upstream end 56e, which is the upstream end of the inner-plate high pressure side through-hole 56, may be substantially positioned at the high pressure side suction-port upstream end which is the upstream end of the high pressure side suction port 2.

From the aforementioned description, when viewed in the rotational axial direction, desirably, the rotation angle of the inner-plate high pressure side suction upstream separator 539 is smaller than or equal to an angle between the low pressure side discharge port 5 and the high pressure side suction port 2. In other words, desirably, the size of the inner-plate high pressure side suction upstream separator 539 in the rotation direction is set to a value in the range of the angle between the low pressure side discharge port 5 and the high pressure side suction port 2. More specifically, desirably, the rotation angle of the inner-plate high pressure side suction upstream separator 539 is smaller than or equal to the angle between the low pressure side discharge-port downstream end, which is the downstream end of the low pressure side discharge port 5, and the high pressure side suction-port upstream end which is the upstream end of the high pressure side suction port 2. When viewed in the rotational axial direction, the angle between the low pressure side discharge-port downstream end and the high pressure side suction-port upstream end is an acute angle that is formed by a line connecting the low pressure side discharge-port downstream end and the rotation center C, and a line connecting the high pressure side suction-port upstream end and the rotation center C.

For the same reason, when viewed in the rotational axial direction, desirably, the rotation angle of the outer-plate high pressure side suction upstream separator 639 is smaller than or equal to the angle between the low pressure side discharge-port downstream end, which is the downstream end of the low pressure side discharge port 5, and the high pressure side suction-port upstream end which is the upstream end of the high pressure side suction port 2.

In the pump of the embodiment, (1) the inner-plate high pressure side recess portion 535 and the inner-plate low pressure side recess portion 534 are separated from each other between the high pressure side discharge port 4 and the low pressure side suction port 3, (3) the inner-plate high pressure side through-hole 56 and the inner-plate low pressure side recess portion 534 are separated from each other between the low pressure side discharge port 5 and the high pressure side suction port 2, (5) the outer-plate high pressure side recess portion 632 and the outer-plate low pressure side through-hole 66 are separated from each other between the high pressure side discharge port 4 and the low pressure side suction port 3, and (7) the outer-plate high pressure side recess portion 632 and the outer-plate low pressure side recess portion 633 are separated from each other between the low pressure side discharge port 5 and the high pressure side suction port 2. These separations are realized and the pressure of oil is increased to two different pressures by forming the inner circumferential cam ring surface 42 of the cam ring 40 into different shapes, instead of forming the high and low pressure side suction ports and the high and low pressure side discharge ports into different shapes. However, the present invention is not limited to this type of pump. For example, the present invention may be applied to a type of pump in which the inner circumferential cam ring surface 42 of the cam ring 40 has a uniform shape, and passages of the oil discharged from pump chambers are formed into different shapes, for example, discharge ports have different shapes, so that the pressure of oil can be increased to two different pressures.

What is claimed is:

1. A vane pump device comprising:
    multiple vanes;
    a rotor that includes vane grooves which are recessed from an outer circumferential surface of the rotor in a rotational radial direction such that the vanes are supported to be movable in the rotational radial direction, and that rotates due to a rotating force received from a rotation shaft;
    a cam ring that includes an inner circumferential surface facing the outer circumferential surface of the rotor, and is disposed to surround the rotor;
    an inner plate disposed on one end portion side of the cam ring in a direction of a rotational axial direction to cover an opening of the cam ring; and
    an outer plate disposed on the other end portion side of the cam ring in the rotational axial direction to cover an opening of the cam ring, wherein
    a cam ring side recess portion is formed in a cam ring side end surface of at least one of the inner plate and the outer plate, said cam ring side recess portion communicating with a center side space which is a space formed in each of the vane grooves on a rotation center side, and supplying a working fluid to the center side space,
    the cam ring side recess portion is composed of multiple sections, which are separated from each other by a separation portion,
    the separation portion is positioned between a discharge recess portion downstream end in the rotational radial direction of one of the multiple sections, through which the working fluid is discharged at a first discharge pressure from a pump chamber, and a suction recess portion upstream end in the rotational radial direction of another of the multiple sections, through which the working fluid is suctioned into a pump chamber discharging the working fluid at a second discharge pressure, and
    a rotation angle in a rotation direction of the separation portion is smaller than or equal to an angle in the rotation direction formed between the discharge recess portion downstream end and the suction recess portion upstream end.

2. The vane pump device according to claim 1, wherein a size in the rotation direction of the separation portion is larger than a size in the rotation direction of the center side space.

3. The vane pump device according to claim 1, wherein the multiple sections include a first recess portion that supplies the working fluid discharged at the first discharge pressure into the center side space, and a second recess portion that supplies the working fluid discharged at the second discharge pressure into the center side space, and
    the first recess portion and the second recess portion are separated from each other by the separation portion.

4. The vane pump device according to claim 1, wherein multiple pump chambers are formed to discharge the working fluid at multiple different discharge pressures during one revolution of the rotation shaft, and each of the pump chambers is formed by two adjacent vanes, the outer circumferential surface of the rotor, the inner circumferential surface of the cam ring, the inner plate, and the outer plate.

5. The vane pump device according to claim 1, further comprising:
    a housing that accommodates the multiple vanes, the rotor, the cam ring, the inner plate, and the outer plate, and includes a first discharge port discharging the working fluid, which is discharged at the first discharge pressure, to the outside, and a second discharge port discharging the working fluid, which is discharged at the second discharge pressure, to the outside.

* * * * *